(12) United States Patent
Koyama et al.

(10) Patent No.: US 7,556,682 B2
(45) Date of Patent: Jul. 7, 2009

(54) ZIRCONIUM OXIDE-TIN OXIDE COMPOSITE SOL, COATING COMPOSITION AND OPTICAL MEMBER

(75) Inventors: Yoshinari Koyama, Sodegaura (JP); Motoko Asada, Sodegaura (JP)

(73) Assignee: Nissan Chemical Industries, Ltd., Tokyo (JP)

( * ) Notice: Subject to any disclaimer, the term of this patent is extended or adjusted under 35 U.S.C. 154(b) by 9 days.

(21) Appl. No.: 11/990,079

(22) PCT Filed: Aug. 7, 2006

(86) PCT No.: PCT/JP2006/315596

§ 371 (c)(1), (2), (4) Date: Feb. 11, 2008

(87) PCT Pub. No.: WO2007/018176

PCT Pub. Date: Feb. 15, 2007

(65) Prior Publication Data

US 2008/0276835 A1    Nov. 13, 2008

(30) Foreign Application Priority Data

Aug. 9, 2005  (JP) ............................. 2005-230340
Aug. 9, 2005  (JP) ............................. 2005-230342

(51) Int. Cl.
*C09D 1/00*  (2006.01)
(52) U.S. Cl. ..................... 106/286.4; 516/90
(58) Field of Classification Search .............. 106/286.4; 516/90
See application file for complete search history.

(56) References Cited

U.S. PATENT DOCUMENTS

| | | | |
|---|---|---|---|
| 4,211,823 A | | 7/1980 | Suzuki et al. |
| 5,460,738 A | * | 10/1995 | Watanabe et al. ............. 516/90 |
| 5,891,362 A | * | 4/1999 | Watanabe et al. ............. 516/88 |
| 6,001,164 A | | 12/1999 | Watanabe et al. |
| 6,040,372 A | | 3/2000 | Watanabe et al. |
| 6,626,987 B1 | * | 9/2003 | Suzuki et al. ........... 106/287.14 |
| 2006/0025518 A1 | * | 2/2006 | Koyama et al. ............. 524/588 |

FOREIGN PATENT DOCUMENTS

| | | |
|---|---|---|
| JP | B2-50-40119 | 12/1975 |
| JP | A-52-11261 | 1/1977 |
| JP | A-53-111336 | 9/1978 |
| JP | A-54-52686 | 4/1979 |
| JP | A-62-151801 | 7/1987 |
| JP | B2-63-37142 | 7/1988 |
| JP | A-63-275682 | 11/1988 |
| JP | A-3-217230 | 9/1991 |
| JP | A-6-24746 | 2/1994 |
| JP | B2-7-25549 | 3/1995 |
| JP | A-9-125003 | 5/1997 |
| JP | A-2001-122621 | 5/2001 |
| JP | A-2001-123115 | 5/2001 |
| JP | B2-3250259 | 1/2002 |
| JP | A-2005-15756 | 1/2005 |
| JP | A-2006-176392 | 7/2006 |

\* cited by examiner

*Primary Examiner*—Melvin C Mayes
*Assistant Examiner*—Michael Forrest
(74) *Attorney, Agent, or Firm*—Oliff & Berridge, PLC

(57) ABSTRACT

There is provided a stable sol of zirconium oxide-tin oxide composite colloidal particles and a method of producing the same, a hard coat material applied for a surface of a plastic lens, and an optical member.

The present invention relates to a sol comprising zirconium oxide-tin oxide composite colloidal particles (A), wherein a molar ratio of oxide in the zirconium oxide-tin oxide composite colloidal particles (A) is 0.02-0.4 as $SnO_2/ZrO_2$, and the zirconium oxide-tin oxide composite colloidal particles (A) have a structure in which zirconium oxide colloidal particles and tin oxide colloidal particles are bonded together, and a primary particle diameter of 2-100 nm; and also relays to a coating composition comprising a silicon-containing substance (S) of an organic silicon compound or a hydrolysate thereof, and a sol comprising zirconium oxide-tin oxide composite colloidal particles (A), and an optical member having a cured coating formed from the coating composition.

21 Claims, No Drawings

ZIRCONIUM OXIDE-TIN OXIDE COMPOSITE SOL, COATING COMPOSITION AND OPTICAL MEMBER

TECHNICAL FIELD

The present invention relates to a zirconium oxide-tin oxide composite sol and a method of producing the same, and also relates to a stable zirconium oxide-tin oxide composite colloid.

In addition, the present invention relates to a coating composition and an optical member that, by using the above-mentioned sol, have excellent warm water resistance of a formed coated article and, moreover, have weather resistance and light resistance of the coated article which is not lowered even when a vapor-deposited coating of inorganic oxide (such as antireflection coating) is applied over the coated article. Furthermore, the present invention is used for various other applications as a hard coat material or a primer applied for a surface of a plastic lens.

BACKGROUND ART

For improving a surface of a plastic lens, which has been used for many applications recently, a metal oxide sol having high refractive index is used as a component of hard coating agent applied on the plastic lens surface.

A hard coating agent containing particles of metal oxides such as Al, Ti, Zr, Sn and Sb having a size of 1-300 nm is described. (for example, see Patent Document 1)

Although a stable sol of tungsten oxide alone is not known yet, a sol obtained by adding a silicate in which a molar ratio of $WO_3:SiO_2:M_2O$ (where M represents alkali metal atom or ammonium group) is 4-15:2-5:1 has been proposed (for example, see Patent Document 2).

A silicate-stannate composite sol in which a molar ratio of Si:Sn is 2-1000:1 has been proposed (for example, see Patent Document 3).

A stable sol containing a modified metal oxide colloid having a particle diameter of 4.5-60 nm which is formed by coating colloidal particle surfaces of metal oxide having a particle diameter of 4-50 nm and a valence of 3, 4 or 5 as nuclei with colloidal particles of a tungsten oxide-stannic oxide composite having a mass ratio of $WO_3/SnO_2$ of 0.5-100 and a particle diameter of 2-7 nm, and containing 2-50% by mass of total metal oxides has been proposed (for example, see Patent Document 4).

A stable modified $SnO_2$—$ZrO_2$ composite sol containing particles formed by coating colloidal particle spices of $SnO_2$—$ZrO_2$ composite having a mass ratio of $ZrO_2/SnO_2$ of 0.02-1.0 and a particle diameter of 4-50 nm as nuclei with colloidal particles of a $WO_3$—$SnO_2$ composite having a mass ratio of $WO_3/SnO_2$ of 0.5-100 and a particle diameter of 2-7 nm has been proposed (for example, see Patent Document 5).

A stable modified metal oxide sol containing particles (C) obtained by coating surfaces of colloidal particles of metal oxide (A) having a primary particle diameter of 2-60 nm as nuclei with colloidal particles of acidic oxide (B), and containing 2-50% by mass of (C) calculated as metal oxide and having a primary particle diameter of 2-100 nm is disclosed. A metal oxide as nuclei which is $SnO_2$ particles or $SnO_2$—$ZrO_2$ composite colloidal particles, and a coating material which is $Sb_2O_5$ particles containing amine (in which, molar ratio of $M/Sb_2O_5$ is 0.02-4.00) have been disclosed (for example, see Patent Document 6).

A production method of a silicic acid-antimonic acid composite solution or a silicic acid-stannic acid composite solution is described in which an alkaline aqueous solution of silicate or a silicate sol dispersion and an alkaline aqueous solution of antimonite or an alkaline aqueous solution of stannate are mixed with a molar ratio of Si:Sb or Si:Sn is 2-1000:1, and then the resultant mixture is decationized by acidic type ion exchanger (for example, see Patent Document 7).

Silicon dioxide-antimony oxide composite sol obtained by dispersing antimony oxide colloidal particles including inorganic silicon oxides of 0.1-50% by mass as $SiO_2$ in a dispersion medium is described (for example, see Patent Document 8).

Plastic molded articles are used widely by utilizing advantages such as lightweight, easy moldability, and high impact resistance. Contrary, plastic molded articles have disadvantages such as being easy to be scratched due to insufficient hardness, being easy to be affected by solvent, absorbing dusts by electrostatic charge and insufficient heat stability. Thus, plastic molded articles have insufficient property for practical use such as glasses lenses and window sashes compared with inorganic glass molded articles. Consequently, applications of protective coating for plastic molded articles are proposed. Much variety of coating composition used for coating is proposed.

"A coating composition using an organic silicon compound or a hydrolysate thereof as a main component (a resin component or a component of a coated film forming)", which is expected to provide a hard coating film whose hardness is close to an inorganic coating film, is used for glasses lenses (for example, see Patent Document 9).

Since the above-mentioned coating composition still has insufficient scratch resistance, a composition in which a colloidal dispersed silica sol is added to the above-mentioned coating composition has also been proposed, and his composition is put into practical use as glasses lenses (for example, see Patent Document 10).

Meanwhile, conventionally, large part of plastic glasses lenses has been produced by cast polymerization using a monomer called diethylene glycol bis(allyl carbonate). These lenses have a refractive index of approximately 1.50. Since this refractive index is lower than a refractive index of glass lenses of 1.52, plastic lenses have disadvantage of having thicker edge for nearsightedness lenses. Thus, recently, a monomer having higher refractive index than diethylene glycol bis(allyl carbonate) has been developed, and resin materials having high refractive index have been proposed.

With respect to such high refractive index plastic lenses, a method using colloid dispersion of metal oxide fine particles of Sb and Ti as a coating material also has been proposed (for example, see Patent Documents 11 and 12).

In addition, a coating composition containing a stable modified metal oxide sol containing particles (C) obtained by coating surfaces of colloidal particles of metal oxide having a primary particle diameter of 2-60 nm and a silane coupling agent (A) as nuclei with colloidal particles of acidic oxide as a coating material (B), and containing 2-50% by mass of (C) calculated as metal oxides and having a primary particle diameter of 2-100 nm is disclosed. Moreover, a metal oxide as nuclei is $SnO_2$ particles or $SnO_2$—$ZrO_2$ composite colloidal particle, and $Sb_2O_5$ particle containing alkyl amine (in which, a molar ratio of $M/Sb_2O_5$ is 0.02-4.00) as a coating material is disclosed (for example, see Patent Document 13).

There is disclosed a coating composition containing a modified metal oxide particles obtained by coating surfaces of colloidal particles (A), as nuclei containing a silane coupling agent and stannic oxide particles or stannic oxide-zirconium oxide composite particles having a mass ratio of 0:1-

0.50:1 based on these oxides and a particle diameter of 4-50 nm with colloidal particles of $Sb_2O_5$ containing alkyl amine having a molar ratio of $M/Sb_2O_5$ of 0.02-4.00 (where M represents an amine molecule), an oligomer thereof or their mixture (B1), and mass ratio of (B1)/(A) is 0.01-0.50 based on the mass ratio of metal oxides and a particle diameter is 4.560 nm (for example, see Patent Document 14).

Patent Document 1: Japanese Patent Application Publication No. JP-B-63-37142 (Claims)
Patent Document 2: Japanese Patent Application Publication No. JP-A-54-52686 (Claims)
Patent Document 3: Japanese Patent Application Publication No. JP-B-50-40119 (Claims)
Patent Document 4: Japanese Patent Application Publication No. JP-A-3-217230 (Claims)
Patent Document 5: Japanese Patent Application Publication No. JP-A-6-24746 (Claims)
Patent Document 6: Japanese Patent Application Publication No. JP-A-2001-122621 (Claims)
Patent Document 7: Japanese Patent Application Publication No. JP-B-50-40119 (Claims)
Patent Document 8: Japanese Patent Application Publication No. JP-B-7-25549 (Claims)
Patent Document 9: Japanese Patent Application Publication No. JP-A-52-11261 (Claims)
Patent Document 10: Japanese Patent Application Publication No. JP-A-53-111336 (Claims)
Patent Document 11: Japanese Patent Application Publication No. JP-A-62-151801 (Claims)
Patent Document 12: Japanese Patent Application Publication No. JP-A-63-275682 (Claims)
Patent Document 13: Japanese Patent Application Publication No. JP-A-2001-123115 (Claims)
Patent Document 14: Japanese Patent Application Publication No. JP-A-2005-015756 (Claims)

DISCLOSURE OF THE INVENTION

Problems to be Solved by the Invention

A silica sol added coating composition has disadvantages of poor appearance of lenses due to showing interference fringes in a coating film. In addition, an antireflection coating film (formed by multilayer structure films of inorganic oxide thin coating films based on the optical interference theory) is often formed on the coating film of a lens. In this case, for example, an antireflection coating film generates very weak green reflected color. Degree of this reflected color varies depending on position of a lens surface, so that color irregularity occurs.

In addition, for a coating composition using titanium oxide sol), since silane coupling of titanium oxide sol and its hydrolysate have poor compatibility, this coating composition has poor stability. Moreover, a coating layer formed with this coating composition has disadvantage of poor water resistance and turning blue by ultraviolet radiation.

For a coating composition using antimony oxide sol, although antimony oxide sol has good compatibility with a silane coupling agent and its hydrolysate thereof and good stability, a refractive index of a coating layer formed with this coating composition is not sufficiently high Use of a related art metal oxide sol, particularly a cationic metal oxide sol for a component of hard coating agent results in not only insufficient stability of obtained hard coating agent, but also insufficient transparency, adhesion and weather resistance of cured coating produced from this hard coating agent. In addition, for the use of $Sb_2O_5$ sol as a hard coating agent component, since the refractive index of $Sb_2O_5$ is approximately 1.65-1.70, if a refractive index of plastic substrate of lenses is higher than or equal to 1.6, ten a refractive index of a cured coating made from this $Sb_2O_5$ sol is not sufficiently increased anymore.

The tungsten oxide sol described in the above-mentioned Japanese Patent Application Publication No. JP-A-54-52686 is obtained by adding a silicate to a tungstic acid aqueous solution prepared by decationizing a tungstate solution. However, the sol is only stable under strong acidic condition. In addition, effect for improving a refractive index of a coating film is low when the sol is used for a component of hard coating agent.

The silicate-stannate composite sol described in the above-mentioned Japanese Patent Application Publication No. JP-B-50-40119 is obtained by decationizing a mixed aqueous solution of an alkali silicate and an alkali stannate, but an effect for improving a refractive index of a coating film is also low when his sol is used for a component of hard coating agent as same as the effect described above.

The modified metal oxide sol described in the above-mentioned Japanese Patent Application Publication JP-A-3-217230 having a refractive index of 1.7 or more is stable, thus it can be used as a component of a hard coating agent for a plastic lens and it can satisfy almost all properties required for a hard coating film such as scratch resistance, transparency, adhesion, water resistance, and weather resistance. However, when a refractive index of a plastic substrate of a lens is higher than or equal to 1.7, a refractive index of a cured coating film is not sufficiently improved.

The modified zirconium oxide-stannic oxide sol described in the above-mentioned Japanese Patent Application Publication No. JP-A-6-24746 having a refractive index of 1.7 or more is stable, thus it can be used as a component of a hard coating agent for a plastic lens, and it can satisfy almost all properties required for a hard coating film such as scratch resistance, transparency, adhesion. However, when a refractive index of a plastic substrate of a lens is higher than or equal to 1.7, also a refractive index of cured coating film is not sufficiently improved.

The present invention aims to provide a stable sol of zirconium oxide-fin oxide composite colloid having stability in wide pH range and a high refractive index (more than or equal to 1.9) and further promoting improvement of properties such as scratch resistance, transparency, adhesion, water resistance and weather resistance when a hard coating film is formed with modified metal oxide described in the Japanese Patent Application Publication Nos. JP-A-3-217230 and JP-A-6-24746. In addition, the metal oxide sol can be used with mixing into a hard coating composition of a hard coating film as an upgrading component for the hard coating film applied to a surface of a plastic lens.

Moreover, the present invention aims to provide a coating composition and an optical member whose coating film has no visible interference fringes and almost no surface irregularity caused by reflected color to a plastic molded article having a medium to high refractive index of nd=1.54-1.70.

Furthermore, the present invention alms to provide a coating composition for a plastic molded article and an optical member having excellent properties such as scratch resistance, surface hardness, abrasion resistance, flexibility, transparency, anti-static property, dyeing affinity, heat resistance, water resistance and chemical resistance.

Means for Solving the Problems

According to a first aspect of the present invention, there is provided a sol containing: zirconium oxide-tin oxide composite colloidal particles (A), in which a molar ratio of oxide in the zirconium oxide-tin oxide composite colloidal particles (A) is 0.02-0.4 as $SnO_2/ZrO_2$, and the zirconium oxide-tin oxide composite colloidal particles (A) have a structure in which zirconium oxide colloidal particles and tin oxide colloidal particles are bonded together, and a primary particle diameter of 2-100 nm.

According to a second aspect, there is provided a sol containing: modified metal oxide particles (A1) formed by coating the surface of zirconium oxide-tin oxide composite colloidal particles (A) as nuclei with amine-containing $Sb_2O_5$ colloidal particles, an oligomer thereof or their mire (B1), in which a molar ratio of oxide in the zirconium oxide-tin oxide composite colloidal particles (A) is 0.02-0.4 as $SnO_2/ZrO_2$, and the zirconium oxide-tin oxide composite colloidal particles (A) have a structure in which zirconium oxide colloidal particles and tin oxide colloidal particles are bonded together, and a primary particle diameter of 2-100 nm, the amine-containing $Sb_2O_5$ colloidal particles, the oligomer thereof or their mixture (B1) have a molar ratio of $M/Sb_2O_5$ (where M represents an amine molecule) of 0.02-4.00, and the modified metal oxide particles (A1) have a mass ratio of (B1)/(A) of 0.01-0.50 based on a mass ratio of their metal oxides, and a particle diameter of 2.5-100 nm.

According to a third aspect, there is provided a sol containing: modified metal oxide particles (AB2) formed by coating the surface of modified metal oxide particles (A1) as nuclei formed by coating the surface of zirconium oxide-tin oxide composite colloidal particles (A) with amine-containing $Sb_2O_5$ colloidal particles, an oligomer thereof or their mixture (B1), with antimony pentoxide-silica composite colloidal particles, an oligomer thereof or their mixture (B2), in which a molar ratio of oxide in the zirconium oxide-tin oxide composite colloidal particles (A) is 0.02-0.4 as $SnO_2/ZrO_2$, and the zirconium oxide-tin oxide composite colloidal particles (A) have a structure in which zirconium oxide colloidal particles and tin oxide colloidal particles are bonded together, and a primary particle diameter of 2-100 nm, the amine-containing $Sb_2O_5$ colloidal particles, the oligomer thereof or their mixture (B1) have a molar ratio of $M/Sb_2O_5$ (where M represents an amine molecule) of 0.02-4.00, the modified metal oxide particles (A1) have a mass ratio of (B1)/(A) of 0.01-0.50 based on a mass ratio of their metal oxides, and a particle diameter of 2.5-100 nm, the antimony pentoxide-silica composite colloidal particles, an oligomer thereof or their mixture (B2) have a molar ratio of $SiO_2/Sb_2O_5$ of 0.55-55, and the modified metal oxide particles (AB2) have a mass ratio of (B2)/(A1) of 0.01-0.50 based on a mass ratio of their metal oxides, and a particle diameter of 2.5-100 nm.

According to a fourth aspect, there is provided a sol containing: modified metal oxide particles (AB3) formed by coating the surface of modified metal oxide particles (A1) as nuclei, formed by coating the surface of zirconium oxide-tin oxide composite colloidal particles (A) with amine-containing $Sb_2O_5$ colloidal particles, an oligomer thereof or their mixture (B1), with tungsten oxide-tin oxide-silicon dioxide composite colloidal particles (B3), in which a molar ratio of oxide in the zirconium oxide-tin oxide composite colloidal particles (A) is 0.02-0.4 as $SnO_2/ZrO_2$, and the zirconium oxide-tin oxide composite colloidal particles (A) have a structure in which zirconium oxide colloidal particles and tin oxide colloidal particles are bonded together, and a primary particle diameter of 2-100 nm, the amine-containing $Sb_2O_5$ colloidal particles, the oligomer thereof or their mixture (B1) have a molar ratio of $M/Sb_2O_5$ (where M represents an amine molecule) of 0.02-4.00, the modified metal oxide particles (A1) have a mass ratio of (B1)/(A) of 0.01-0.50 based on a mass ratio of their metal oxides, and a particle diameter of 2.5-100 nm, the tungsten oxide-tin oxide-silicon dioxide composite colloidal particles (B3) have a mass ratio of $WO_3/SnO_2$ of 0.1-100, a mass ratio of $SiO_2/SnO_2$ of 0.1-100, and a particle diameter of 2-7 nm, and the modified metal oxide particles (AB3) have a mass ratio of (B3)/(A1) of 0.02-1 based on a mass ratio of their metal oxides, and a particle diameter of 2.5-100 nm.

According to a fifth aspect, a method of producing the sol containing the zirconium oxide-tin oxide composite colloidal particles (A) according to the first aspect includes process (a) including mixing an oxyzirconium salt aqueous solution having a concentration of 0.1-50% by mass calculated as $ZrO_2$ and an oxystannate aqueous solution having a concentration of 0.1-50% by mass at a molar ratio of 0.02-0.4 as $SnO_2/ZrO_2$, treating a resultant mixture solution hydrothermally at 100-200° C. for 0.1-50 hours, producing an aqueous solution containing zirconium oxide-tin oxide composite colloidal particles in which a primary particle diameter is 2-100 nm and a molar ratio of $SnO_2/ZrO_2$ is 0.02-0.4, and removing electrolyte from the solution.

According to a sixth aspect, a method of producing the sol containing the modified metal oxide particles (A1) according to the second aspect includes processes (a) and (a1), the process (a) including mixing an oxyzirconium salt aqueous solution having a concentration of 0.1-50% by mass calculated as $ZrO_2$ and an oxystannate aqueous solution having a concentration of 0.1-50% by mass at a molar ratio of 0.02-0.4 as $SnO_2/ZrO_2$, treating a resultant mixture solution hydrothermally at 100-200° C. for 0.1-50 hours, producing an aqueous solution containing zirconium oxide-tin oxide composite colloidal particles in which a primary particle diameter is 2-100 nm and a molar ratio of $SnO_2/ZrO_2$ is 0.02-0.4, and removing electrolyte from the solution, and the process (a1) including coating the particle surface of a sol containing zirconium oxide-tin oxide composite colloidal particles (A) obtained by the process (a) with amine-containing $Sb_2O_5$ colloidal particles having a molar ratio of $M/Sb_2O_5$ (where M represents an amine molecule) of 0.02-4.00, an oligomer thereof or their re (B1), at a mass ratio of (B1)/(A) calculated as their metal oxide of 0.01-0.50, aging a resultant aqueous medium at 20-100° C. for 0.1-50 hours, and removing electrolyte from the solution.

According to a seventh aspect, a method of producing the sol containing the modified metal oxide particles (A1) according to the second aspect includes processes (a), (a1) and (b1), the process (a) including mixing an oxyzirconium salt aqueous solution having a concentration of 0.1-50% by mass calculated as $ZrO_2$ and an oxystannate aqueous solution having a concentration of 0.1-50% by mass at a molar ratio of 0.02-0.4 as $SnO_2/ZrO_2$, treating a resultant mixture solution hydrothermally at 100-200° C. for 0.1-50 hours, producing an aqueous solution containing zirconium oxide-tin oxide composite colloidal particles in which a primary particle diameter is 2-100 nm and a molar ratio of $SnO_2/ZrO_2$ is 0.02-0.4, and removing electrolyte from the solution, the process (a1) including coating the particle surface of a sol containing zirconium oxide-tin oxide composite colloidal particles (A) obtained by the process (a), with amine-containing $Sb_2O_5$ colloidal particles having a molar ratio of $M/Sb_2O_5$ (where M represents an amine molecule) of 0.02-4.00, an oligomer thereof or their mixture (B1), at a mass ratio of (B1)/(A) calculated as their metal oxide of 0.01-0.50, aging a resultant aqueous medium at 20-100° C. for 0.1-50 hours, and removing electrolyte from the solution, and the process (b1) including coating the particle surface of the sol containing metal oxide particles (A1) obtained by the process (a1) again with amine-containing $Sb_2O_5$ colloidal particles having a molar ratio of $M/Sb_2O_5$ (where M represents an amine molecule) of 0.02-4.00, an oligomer thereof or their mixture (B1), at a mass ratio of (B1)/(A1) calculated as their metal oxide of less than or equal to 0.49, aging a resultant aqueous medium at 20-100° C. for 0.1-50 hours, and removing electrolyte from the solution.

According to an eighth aspect, a method of producing the sol containing the modified metal oxide particles (AB2) according to the third aspect includes processes (a), (a1) and (b2), the process (a) including mixing an oxyzirconium salt aqueous solution having a concentration of 0.1-50% by mass calculated as $ZrO_2$ and an oxystannate aqueous solution having a concentration of 0.1-50% by mass at a molar ratio of 0.02-0.4 as $SnO_2/ZrO_2$, treating a resultant mixture solution hydrothermally at 100-200° C. for 0.1-50 hours, producing an aqueous solution containing zirconium oxide-tin oxide composite colloidal particles in which a primary particle diameter is 2-100 nm and a molar ratio of $SnO_7/ZrO_2$ is 0.02-0.4, and removing electrolyte from the solution, the process (a1) including coating the particle surface of a sol containing zirconium oxide-tin oxide composite colloidal particles (A) obtained by the process (a) with amine-containing $Sb_2/O_5$ colloidal particles having a molar ratio of $M/Sb_2O_5$ (where M represents an amine molecule) of 0.02-4.00, an oligomer thereof or their mixture (B1), at a mass ratio of (B1)/(A) calculated as their metal oxide of 0.01-0.50, aging a resultant aqueous medium at 20-100° C. for 0.1-50 hours, and removing electrolyte from the solution, and the process (b2) including mixing a sol containing zirconium oxide-tin oxide composite colloidal particles (A1) obtained by the process (a1) with an aqueous medium containing antimony pentoxide-silica composite colloidal particles having a molar ratio of $SiO_2/Sb_2O_5$ of 0.55-55, an oligomer thereof or their mixture (B2), at a mass ratio of (B2)/(A1) calculated as their metal oxide of 0.01-0.50, aging a resultant aqueous medium at 20-100° C. for 0.1-50 hours, and removing electrolyte from the solution.

According to a ninth aspect a method of producing the sol containing the modified metal oxide particles (AB3) according to the fourth aspect includes processes (a), (a1) and (b3), the process (a) including mixing an oxyzirconium salt aqueous solution having a concentration of 0.1-50% by mass calculated as $ZrO_2$ and an oxystannate aqueous solution having a concentration of 0.1-50% by mass at a molar ratio of 0.02-0.4 as $SnO_2/ZrO_2$, treating a resultant mixture solution hydrothermally at 100-200° C. for 0.1-50 hours, producing an aqueous solution containing zirconium oxide-tin oxide composite colloidal particles in which a primary particle diameter is 2-100 nm and a molar ratio of $SnO_2/Zr_2$ is 0.02-0.4, and removing electrolyte from the solution, the process (a1) including coating the particle surface of a sol containing zirconium oxide-tin oxide composite colloidal particles (A) obtained by the process (a) with amine-containing $Sb_2O_5$ colloidal particles having a molar ratio of $M/Sb_2O_5$ (where M represents an amine molecule) of 0.02-4.00, an oligomer thereof or their mixture (B1), at a mass ratio of (B1)/(A) calculated as their metal oxide of 0.01-0.50, aging a resultant aqueous medium at 20-100° C. for 0.1-50 hours, and removing electrolyte from the solution, and the process (b3) including preparing an aqueous solution containing tungstate, stannate and silicate having a mass ratio of $WO_3/SnO_2$ of 0.1-100 and a mass ratio of $SiO_2/SnO_2$ of 0.1-100, producing a tungsten oxide-tin oxide-silicon dioxide composite (B3) sol by removing cations exiting in the aqueous solution, mixing the aqueous sol of zirconium oxide-tin oxide composite (A1) obtained by the process (a1) with the tungsten oxide-tin oxide silicon dioxide composite (B3) sol having a particle diameter of 2-7 nm, and a mass ratio of $WO_3/SnO_2$ of 0.1-100 and a mass ratio of $SiO_2/SnO_2$ of 0.1-100, at a mass ratio of (B3)/(A1) calculated as their metal oxide of 0.02-1, aging a resultant aqueous medium at 20-100° C. for 0.1-50 hours, and removing electrolyte from the solution.

According to a tenth aspect, a method of producing the sol containing the modified metal oxide particles (A1) according to the second aspect includes processes (a) and (a2), the process (a) including mixing an oxyzirconium salt aqueous solution having a concentration of 0.1-50% by mass calculated as $ZrO_2$ and an oxystannate aqueous solution having a concentration of 0.1-50% by mass at a molar ratio of 0.02-0.4 as $SnO_2/ZrO_2$, treating a resultant mixture solution hydrothermally at 100-200° C. for 0.1-50 hours, producing an aqueous solution containing zirconium oxide-tin oxide composite colloidal particles in which a primary particle diameter is 2-100 nm and a molar ratio of $SnO_2/ZrO_2$ is 0.02-0.4, and removing electrolyte from the solution, and the process (a2) including coating the particle surface of a sol containing zirconium oxide-tin oxide composite colloidal particles (A) obtained by the process (a) with an amine-containing $Sb_2O_5$ colloidal particle having a molar ratio of $M/Sb_2O_5$ (where M represents an amine molecule) of 0.02-4.00, an oligomer thereof or their mixture (B1), at a mass ratio of (B1)/(A) calculated as their metal oxide of 0.01-0.50, aging a resultant aqueous medium at 20-100° C. for 0.1-50 hours, removing electrolyte from the solution, and then treating the solution hydrothermally at 200-300° C. for 0.1-50 hours.

According to an eleventh aspect, a method of producing the sol containing the modified metal oxide particles (A1) according to the second aspect includes processes (a), (a2) and (b1), the process (a) including mixing an oxyzirconium salt aqueous solution having a concentration of 0.1-50% by mass calculated as $ZrO_2$ and oxystannate aqueous solution having a concentration of 0.1-50% by mass at a molar ratio of 0.02-0.4 as $SnO_2/ZrO_2$, treating a resultant mixture solution hydrothermally at 100-200° C. for 0.1-50 hours, producing an aqueous solution containing zirconium oxide-tin oxide composite colloidal particles in which a primary particle diameter is 2-100 nm and a molar ratio of $SnO_2/ZrO_2$ is 0.02-0.4, and removing electrolyte from the solution, the process (a2) including coating the particle surface of a sol containing zirconium oxide-tin oxide composite colloidal particles (A) obtained by the process (a) with amine-containing $Sb_2O_5$ colloidal particles having a molar ratio of $M/Sb_2O_5$ (where M represents an amine molecule) of 0.02-4.00, an oligomer thereof or their mixture (B1), at a mass ratio of (B1)/(A) calculated as their metal oxide of 0.01-0.50, aging a resultant aqueous medium at 20-100° C. for 0.1-50 hours, removing electrolyte from the solution, and then treating the solution hydrothermally at 200-300° C. for 0.1-50 hours, and the process (b1) including coating the particle surface of the sol containing amine-containing zirconium oxide-tin oxide composite colloidal particles (A1) obtained by the process (a2) with the amine-containing $Sb_2O_5$ colloidal particles having a molar ratio of $M/Sb_2O_5$ (where M represents an amine molecule) of 0.02-4.00, the oligomer thereof or their mixture (B1), at a mass ratio of (B1)/(A1) calculated as their metal oxide of less than or equal to 0.49, aging a resultant aqueous medium at 20-100° C. for 0.1-50 hours, and removing electrolyte from the solution.

According to a twelfth aspect, a method of producing the sol containing the modified metal oxide particles (AB2) according to the third aspect includes processes (a), (a2) and (b2), the process (a) including mixing an oxyzirconium salt aqueous solution having a concentration of 0.1-50% by mass calculated as $ZrO_2$ and an oxystannate aqueous solution having a concentration of 0.1-50% by mass at a molar ratio of 0.02-0.4 as $SnO_2/ZrO_2$, treating a resultant mixture solution hydrothermally at 100-200° C. for 0.1-50 hours, producing an aqueous solution containing zirconium oxide-tin oxide composite colloidal particles in which a primary particle diameter is 2-100 nm and a molar ratio of $SnO_2/ZrO_2$ is 0.02-0.4, and removing electrolyte from the solution, the process (a2) including coating the particle surface of a sol containing zirconium oxide-tin oxide composite colloidal particles (A) obtained by the process (a) with amine-containing $Sb_2O_5$ colloidal particles having a molar ratio of $M/Sb_2O_5$ (where M represents an amine molecule) of 0.02-4.00, an oligomer thereof or their mixture (1), at a mass ratio of (B1)/(A) calculated as their metal oxide of 0.01-0.50, aging a resultant aqueous medium at 20-100° C. for 0.1-50 hours, removing electrolyte from the solution, and then treating the solution hydrothermally at 20-300° C. for 0.1-50, and the process (b2) including: mixing a sol containing amine-containing zirconium oxide-tin oxide composite colloidal particles (A1) obtained by the process (a2) with an aqueous medium of antimony pentoxide-silica composite colloidal particles having a molar ratio of $SiO_2/Sb_2O_5$ of 0.55-55, an oligomer thereof or their mixture (B2), at a mass ratio of (B2)/(A1) calculated as their metal oxide of 0.01-0.50, aging a resultant aqueous medium at 20-100° C. for 0.1-50 hours, and removing electrolyte from the solution.

According to a thirteenth aspect, a method of producing the sol containing the modified metal oxide particles (AB3) according to the fourth aspect includes processes (a), (a2) and (b3), the process (a) including mixing an oxyzirconium salt aqueous solution having a concentration of 0.1-50% by mass calculated as $ZrO_2$ and an oxystannate aqueous solution having a concentration of 0.1-50% by mass at a molar ratio of 0.02-0.4 as $SnO_2/ZrO_2$, treating a resultant mixture solution hydrothermally at 100-200° C. for 0.1-50 hours, producing an aqueous solution containing zirconium oxide-tin oxide composite colloidal particles in which a primary particle diameter is 2-100 nm and a molar ratio of $SnO_2/ZrO_2$ is 0.02-0.4, and removing electrolyte from the solution, the process (a2) including coating the particle surface of a sol containing zirconium oxide-tin oxide composite colloidal particles (A) obtained by the process (a) with amine-containing $Sb_2O_5$ colloidal particles having a molar ratio of $M/Sb_2O_5$ (where M represents an amine molecule) of 0.02-4.00, an oligomer thereof or their mixture (B1), at a mass ratio of (B1)/(A) calculated as their metal oxide of 0.01-0.50, aging a resultant aqueous medium at 20-100° C. for 0.1-50 hours, removing electrolyte from the solution, and then treating the solution hydrothermally at 200-300° C. for 0.1-50 hours, and the process (b3) including preparing an aqueous solution containing tungstate, stannate and silicate having a mass ratio of $WO_3/SnO_2$ of 0.1-100 and a mass ratio of $SiO_2SnO_2$ of 0.1-100, producing a tungsten oxide-tin oxide-silicon dioxide composite (B3) sol by removing cations exiting in the aqueous solution, mixing an aqueous sol of zirconium oxide-tin oxide composite (A1) obtained by the process (a2) and the tungsten oxide-tin oxide-silicon dioxide composite (B3) sol having a particle diameter of 2-7 nm, and a mass ratio of $WO_3/SnO_2$ of 0.1-100 and a mass ratio of $SiO_2/SnO_2$ of 0.1-100, at a mass ratio of (B3)/(A1) calculated as their metal oxide of 0.02-1, aging a resultant aqueous medium at 20-100° C. for 0.1-50 hours, and removing electrolyte from the solution.

According to a fourteenth aspect, there is provided a coating composition containing a component (S) and a component (T1), in which the component (S) is at least one silicon-containing substance selected from a group consisting of an organic silicon compound represented in Formula (I):

(where each of $R^1$ and $R^3$ is selected from organic groups having alkyl group, aryl group, halogen alkyl group, halogenated aryl group, alkenyl group, or an epoxy group, acryloyl group, methacryloyl group, mercapto group, amino group, or cyano group, and bonding to silicon atoms with Si—C bond; $R^2$ is alkyl group, alkoxyalkyl group or acyl group of 1-8 carbon(s); each of a and b is an integer of 0, 1 or 2, and a+b is an integer of 0, 1 or 2) and, in Formula (II):

(where $R^4$ is alkyl group of 1-5 carbon(s); X is alkyl group or acyl group of 1-4 carbon(s); Y is methylene group or alkylene group of 2-20 carbons, and c is an integer of 0 or 1), and a hydrolysate thereof, and the component (T1) is a sol containing zirconium oxide-tin oxide composite colloidal particles (A), the zirconium oxide-tin oxide composite colloidal particles (A) having a molar ratio of oxides therein of 0.02-0.4 as $SnO_2/ZrO_2$, a structure in which zirconium oxide colloidal particles and tin oxide colloidal particles are bonded together, and a primary particle diameter of 2-100 nm.

According to a tenth aspect, there is provided a coating composition containing a component (S) and a component (T2), in which the component (S) is at least one silicon-containing substance selected from a group consisting of an organic silicon compound represented in Formula (I):

(where each of $R^1$ and $R^3$ is selected from organic groups having alkyl group, aryl group, halogenated alkyl group, halogenated aryl group, alkenyl group, or epoxy group, acryloyl group, methacryloyl group, mercapto group, amino group, or cyano group, and bonding to silicon atoms with Si—C bond; $R^2$ is alkyl group, alkoxyalkyl group or acyl group of 1-8 carbon(s); each of a and b is an integer of 0, 1 or 2, and a+b is an integer of 0, 1 or 2) and, in Formula (II):

(where $R^4$ is alkyl group of 1-5 carbon(s); X is alkyl group or acyl group of 1-4 carbon(s); Y is methylene group or alkylene group of 2-20 carbons, and c is an integer of 0 or 1), and a hydrolysate thereof, and the component (T2) is a sol containing modified metal oxide particles (A1) formed by coating the surface of zirconium oxide-tin oxide composite colloidal particles (A) as nuclei with amine-containing $Sb_2O_5$ colloidal particles, an oligomer thereof or their mixture (B1), in which a molar ratio of oxide in the zirconium oxide-tin oxide composite colloidal particles (A) is 0.02-0.4 as $SnO_2/ZrO_2$, and the zirconium oxide tin oxide composite colloidal particles (A) have a structure in which zirconium oxide colloidal particles and tin oxide colloidal particles am bonded together, and a primary particle diameter of 2-100 nm, the amine-containing $Sb_2O_5$ colloidal particles, the oligomer thereof or their mixture (B1) have a molar ratio of $M/Sb_2O_5$ (where M represents an amine molecule) of 0.02-4.00, and the modified metal oxide particles (A1) have a mass ratio of (B1)/(A) of 0.01-0.50 based on a mass ratio of their metal oxides, and a particle diameter of 2.5-100 nm.

According to a sixteenth aspect, there is provided a coating composition containing a component (S) and a component (T3), in which the component (S) is at least one silicon-containing substance selected from a group consisting of an organic silicon compound represented in Formula (I):

$$(R^1)_a(R^3)_b Si(OR^2)_{4-(a+b)} \quad (I)$$

(where each of $R^1$ and $R^3$ is selected from organic groups having all group, aryl group, halogenated alkyl group, halogenated aryl group, alkenyl group, or epoxy group, acryloyl group, methacryloyl group, mercapto group, amino group, or cyano group, and bonding to silicon atoms with Si—C bond; $R^2$ is alkyl group, alkoxyalkyl group or acyl group of 1-8 carbon(s); each of a and b is an integer of 0, 1 or 2, and a+b is an integer of 0, 1 or 2) and, in Formula (II):

$$[(R^4)_c Si(OX)_{3-c}]_2 Y \quad (II)$$

(where $R^4$ is alkyl group of 1-5 carbon(s); X is alkyl group or al group of 1-4 carbon(s); Y is methylene group or alkylene group of 2-20 carbons, and c is an integer of 0 or 1), and a hydrolysate thereof, and the component (T3) is a sol containing modified metal oxide particles (AB2) formed by coating the surface of modified metal oxide particles (A1) as nuclei formed by coating the surface of zirconium oxide-tin oxide composite colloidal particles (A) with amine-containing $Sb_2O_5$ colloidal particles, an oligomer thereof or their mixture (B1), with antimony pentoxide-silica composite colloidal particles, an oligomer thereof or their mixture (B2), in which a molar ratio of oxide in the zirconium oxide-tin oxide composite colloidal particles (A) is 0.02-0.4 as $SnO_2/ZrO_2$, and the zirconium oxide-tin oxide composite colloidal particles (A) have a structure in which zirconium oxide colloidal particles and tin oxide colloidal particles are bonded together, and a primary particle diameter of 2-100 nm, the amine-containing $Sb_2O_5$ colloidal particles, the oligomer thereof or their mixture (B1) have a molar ratio of $M/Sb_2O_5$ (where M represents an amine molecule) of 0.02-4.00, the modified metal oxide particles (A1) have a mass ratio of (B1)/(A) of 0.01-0.50 based on a mass ratio of their metal oxides, and a particle diameter of 2.5-100 nm, the antimony pentoxide-silica composite colloidal particles, the oligomer thereof or their mixture (B2) have a molar ratio of $SiO_2/Sb_2O_5$ of 0.55-55, and the modified metal oxide particles (AB2) have a mass ratio of (B2)/(A1) of 0.01-0.50 based on a mass ratio of their metal oxides, and a particle diameter of 2.5-100 nm.

According to a seventeenth aspect, there is provided a coating composition containing a component (S) and a component (T4), in which the component (S) is at least one silicon-containing substance selected from a group consisting of an organic silicon compound represented in Formula (I):

$$(R^1)_a(R^3)_b Si(OR^2)_{4-(a+b)} \quad (I)$$

(where each of $R^1$ and $R^3$ is selected from organic groups having alkyl group, aryl group, halogenated alkyl group, halogenated aryl group, alkenyl group, or epoxy group, acryloyl group, methacryloyl group, mercapto group, amino group, or cyano group, and bonding to silicon atoms with Si—C bond; $R^2$ is alkyl group, alkoxyalkyl group or acyl group of 1-8 carbon(s); each of a and b is an integer of 0, 1 or 2, and a+b is an integer of 0, 1 or 2) and, in Formula (II):

$$[(R^4)_c Si(OX)_{3-c}]_2 Y \quad (II)$$

(where $R^4$ is alkyl group of 1-5 carbon(s); X is acyl group or acyl group of 1-4 carbon(s); Y is methylene group or alkylene group of 2-20 carbons, and c is an integer of 0 or 1), and a hydrolysate thereof, and the component (T4) is a sol containing modified metal oxide particles (AB3) formed by coating the surface of modified metal oxide particles (A1) as nuclei, formed by coating the surface of zirconium oxide-tin oxide composite colloidal particles (A) with amine-containing $Sb_2O_5$ colloidal particles, an oligomer thereof or their mixture (B1), with tungsten oxide-tin oxide-silicon dioxide composite colloidal particles (B3), in which a molar ratio of oxide in the zirconium oxide-tin oxide composite colloidal particles (A) is 0.02-0.4 as $SnO_2/ZrO_2$, and the zirconium oxide-tin oxide composite colloidal particles (A) have a structure in which zirconium oxide colloidal particles and tin oxide colloidal particles are bonded together, and a primary particle diameter of 2-100 nm, the amine-containing $Sb_2O_5$ colloidal particles, the oligomer thereof or their mixture (B1) have a molar ratio of $M/Sb_2O_5$ (where M represents an amine molecule) of 0.02-4.00, the modified metal oxide particles (A1) have a mass ratio of (B1)/(A) of 0.01-0.50 based on a mass ratio of their metal oxides, and a particle diameter of 2.5-100 nm, the tungsten oxide-tin oxide-silicon dioxide composite colloidal particles (B3) have a mass ratio of $WO_3/SnO_2$ of 0.1-100 and a mass ratio of $SiO_2/SnO_2$ of 0.1-100, and a particle diameter of 2-7 nm, and the modified metal oxide particles (AB3) have a mass ratio of (B3)/(A1) of 0.02-1 based on a mass ratio of their metal oxides, and a particle diameter of 2.5-100 nm.

According to an eighteenth aspect, the coating composition according to any one of the fourteenth to seventeenth aspects is arranged such that the component (S) contains at least one silicon-containing substance selected from a group consisting of an organic silicon compound represented in Formula (I) and a hydrolysate thereof.

According to a nineteenth aspect, the coating composition according to any one of the fourteenth to eighteenth aspects is arranged such that the coating composition contains at least one curing catalyst selected from a group consisting of metal salts, metal alkoxides and metal chelate compounds.

According to a twentieth aspect, there is provided an optical member having a cured coating formed on a surface of an optical substrate by the coating composition according to any one of the fourteenth to nineteenth aspects.

According to a twenty-first aspect, there is provided an optical member further including an anti-reflective coating on the surface of the optical member according to the twentieth aspect.

EFFECTS OF THE INVENTION

A zirconium oxide-tin oxide composite sol of the present invention is obtained by reacting zirconium salts and tin salts, using the resultant mixture or a composite salt of zirconium oxide and tin oxide as raw materials and treating the liquid medium hydrothermally. The obtained metal oxide compound has various excellent improved properties which are disadvantage of related art metal oxide colloids such as compatibility, dispersibility, and especially weather resistance and light stability.

In the present invention, tin oxide is used for controlling a particle diameter of zirconium oxide. Preferable molar ratio of tin oxide is 0.02-0.4 as $SnO_2/ZrO_2$. A higher molar ratio than 0.4 is acceptable, but is not preferable due to decrease in light stability, which is excellent characteristics of $ZrO_2$. Also, a lower molar ratio than 0.02 is not preferable because the effect of controlling a particle diameter is insufficient.

Generally, it has been known t, a production of zirconium oxide by hydrolysis method needs much time to mature a reaction when only heat is applied. As a result of an intensive investigation, addition and composite formation of tin oxide or a precursor thereof during hydrolysis of zirconium salt facilitates the hydrolysis and enables control of the particle diameter.

An object of the present invention is to provide a sol which can be used by mixing into a hard coating composition or a coating composition for primer as an upgrading component for a hard coating film.

Use of the present invention can solve problems such as yellowing caused by ultraviolet radiation, water resistance, and compatibility, which are observed when related art metal oxide sols are used, by mixing a zirconium oxide-tin oxide composite sol as an upgrading component for a hard coating film applied on surface of a plastic lens into its hard coating composition or coating composition for primer.

A sol of zirconium oxide-tin oxide composite colloidal particles of the present invention is transparent and colorless, and has a refractive index of approximately 1.85-1.95 calculated from a dried coating film thereof, high bond strength and hardness, and excellent weather resistance, antistatic property, heat stability and abrasion resistance. Particularly, the sol of zirconium oxide-tin oxide composite colloidal particles of the present invention has remarkably improved weather resistance and moisture resistance red with related art sols.

The sol is stable at pH 1-10, preferably 2-9, and can provide sufficient stability for supply as industrial products.

The sol having these properties of the present invention is particularly effective as an upgrading component for several properties such as dyeing affinity, chemical resistance, water resistance, moisture resistance, light stability, weather resistance, abrasion resistance and a refractive index in order to form hard coating on a plastic lens.

A cured coating obtained by a coating composition of the present invention forms a coating layer having improved properties such as scratch resistance, surface hardness, abrasion resistance, transparency, heat resistance, light stability, weather resistance and particularly water resistance. In addition, adhesion between an antireflection coating film (inorganic oxides, fluoride and the like), a vapor-deposited metal coating film and the like formed on the coating layer, and the coating layer is excellent.

An optical member of the present invention has excellent properties such as scratch resistance, surface hardness, abrasion resistance, transparency, heat resistance, light stability, weather resistance and particularly water resistance. Moreover, the optical member has high transparency and good appearance as well as interference fringes which are unseen even if this optical member is applied to a high refractive index member having a refractive index more than or equal to 1.54.

The sol of the present invention can be used for other various applications. By applying this sol to the surface of several materials such as organic fibers, textile goods and paper, these materials can obtain improved properties such as flame retardancy, surface slip prevention, antistatic property, and dyeing affinity. In addition, these sols can be used for a binder of several materials such as ceramic fibers, glass fibers and ceramics. Moreover, by using these sols mixed with various coating compositions or various adhesives, the cured coating film thereof can obtain improved properties such as water resistance, chemical resistance, light stability, weather resistance, abrasion resistance and flame retardancy. Furthermore, these sols cm also be used for sure treatment agent for several materials such as metal materials, ceramic materials, glass materials, and plastic materials. Moreover, these sols can be useful for a catalyst component.

The sol of the present invention can also be used for impact absorption coating film of glasses lenses. The impact absorption coating film improves impact resistance of lenses. The impact absorption coating film includes the sol of the present invention and rest such as polyacrylic type resins, polyvinyl acetate type resins and polyvinyl alcohol type resins.

A cured coating on lenses for eyewear made of a coating composition of the sol of the present invention can be used for a reflection coating film as a high refractive index film. Moreover, addition of functional components such as antifog, photochromic, and antifouling enables its use as multi-functional coating film.

An optical member having a cured coating made of a coating composition including a sol of the present invention and a silane coupling agent can be used for lenses for cameras, windshields of automobiles, optical filters adapted on displays such as liquid crystal displays and plasma displays, other than lenses for eyewear.

BEST MODES FOR CARRYING OUT THE INVENTION

In the present invention, as a fundamental row material sol, a sol is used which contains zirconium oxide-tin oxide composite colloidal particles (A), in which a molar ratio of oxide in the zirconium oxide-tin oxide composite colloidal particles (A) is 0.02-0.4 as $SnO_2/ZrO_2$, and the zirconium oxide-tin oxide composite colloidal particles (A) have a structure in which zirconium oxide colloidal particles and tin oxide colloidal particles are bonded together, and a primary particle diameter of 2-100 nm. The sol containing zirconium oxide-tin oxide composite colloidal particles (A) has a pH of 1-10.

This sol is obtained by a production method including process (a) including mixing an oxyzirconium salt aqueous solution having a concentration of 0.1-50% by mass calculated as $ZrO_2$ and an oxystannate aqueous solution having a concentration of 0.1-50% by mass at a molar ratio of 0.02-0.4 as $SnO_2/ZrO_2$, treating a resultant mixture solution hydrothermally at 100-200° C. for 0.1-50 hours, producing an aqueous solution containing zirconium oxide-tin oxide composite colloidal particles in which a primary particle diameter is 2-100 nm and a molar ratio of $SnO_2/ZrO_2$ is 0.02-0.4, and removing electrolyte from the solution.

Examples of oxyzirconium salts include zirconium oxychloride, zirconium oxynitrate, zirconium oxysulfate, zirconium ammonium carbonate, zirconium potassium carbonate, zirconium oxycarbonate, and zirconium oxyacetate. These oxyzirconium salts may be used as solids or aqueous solutions, and they may preferably be used as aqueous solutions having a concentration of approximately 0.5-50% by mass, more preferably approximately 0.5-30% by mass as $ZrO_2$.

As oxystannates, an aqueous solution of tin oxychloride is preferable, and can be used as a solution containing approximately 0.5-30% by mass as $ZrO_2$. In mixing of an oxystannate and an oxyzirconium salt, a preferable temperature is 0-100° C., and more preferable temperature is a room temperature (20° C.) to 90° C.

Under agitation, this mixing can be performed by adding an oxyzirconium salt to an aqueous solution of tin oxychloride; or by adding an aqueous solution of tin oxychloride to an oxyzirconiulm salt. This mixing should be performed sufficiently, and a mixing time of 0.5-3 hours is preferable.

Since an obtained zirconium oxide-tin oxide composite colloidal slurry contains much of anion such as $Cl^-$; $NO_3^-$ and $CH_3COO^-$ derived from oxyzirconium salt or stannic oxychloride, colloidal particles cause micro-aggregation, and thus transparency of the sol is deceased.

By removing electrolyte such as anion in the above-mentioned sol, non-aggregated and high transparent sol can be obtained. Examples of a method of removing electrolyte include ultrafiltration method and ion exchange method, and particularly irrigation and wash by ultrafiltration is preferable.

When concentration of the obtained sol is low, concentration of the sol may be increased by usual condensation method such as evaporation method and ultrafiltration method, if desired. Ultrafiltration is particularly preferable method.

In this condensation process, the temperature of the sol is preferably maintained below approximately 100° C., particularly below 60° C.

The above-mentioned sol containing zirconium oxide-tin oxide composite colloidal particles (A) may be coated with an amine-containing antimony pentoxide colloid, an oligomer thereof or their mixture (B1). That is, in the present invention, as a nuclei sol, a sol may be used which contains modified metal oxide particles (A1) formed by coating the surface of the zirconium oxide-tin oxide composite colloidal particles (A) as nuclei with amine-containing $Sb_2O_5$ colloidal particles, an oligomer thereof or their mixture (B1), in which a molar ratio of oxide in the zirconium oxide-tin oxide composite colloidal particles (A) is 0.02-0.4 as $SnO_2/ZrO_2$, and the zirconium oxide-tin oxide composite colloidal particles (A) have a structure in which zirconium oxide colloidal particles and tin oxide colloidal particles are bonded together, and a primary particle diameter of 2-100 nm, and the amine-containing $Sb_2O_5$ colloidal particles, the oligomer thereof or their mixture (B1) have a molar ratio of $M/Sb_2O_5$ (where M represents an amine molecule) of 0.02-4.00, and the modified metal oxide particles (A1) have a mass ratio of (B1)/(A) of 0.01-0.50 based on a mass ratio of their metal oxides, and a particle diameter of 2.5-100 nm. The sol containing his metal oxide particles (A1) has a pH of 1-10.

A method of production of the sol containing this modified metal oxide particles (A1) is obtained by a production method including the process (a), and thereafter process (a1) which includes coating the particle surface of the sol containing zirconium oxide-tin oxide composite colloidal particles (A) obtained by the process (a) with amine-containing $Sb_2O_5$ colloidal particles having a molar ratio of $M/Sb_2O_5$ (where M represents an amine molecule) of 0.02-4.00, an oligomer thereof or their mixture (B1), at a mass ratio of (B1)/(A) calculated as their metal oxides of 0.01-0.50, aging a resultant aqueous medium at 20-100° C. for 0.1-50 hours, and removing electrolyte.

The above-mentioned amine-containing $Sb_2O_5$ colloid, the oligomer thereof or their mixture (B1) is obtained by methods (such as oxidation methods and acid decomposition methods) described below. Examples of an acid decomposition method include a method in which, after an alkali antimonate is reacted with an inorganic acid, aggregation of resultant particles is destroyed with an amine (Japanese Patent Application Publication Nos. JP-A-60-41536, JP-A-61-227918 and JP-A-2001-123115), and examples of oxidation methods include a method in which antimony trioxide is oxidized with hydrogen peroxide under coexistence of an amine or an alkali metal (Japanese Patent Application Publication Nos. JP-B-57-11848 and JP-A-59-232921); and a method in which, after antimony trioxide is oxidized with hydrogen peroxide, an amine or an alkali metal is added.

Examples of amines of the above-mentioned amine-containing $Sb_2O_5$ colloid, the oligomer thereof or their mixture (B1) include ammonium, a quaternary ammonium and a water-soluble anime. Preferable examples of these amines include alkyl amines such as isopropyl amine, diisopropyl amine, n-propyl amine, diisobutyl amine; aralkyl amines such as benzyl amine; alicyclic amines such as piperidine; alkanol amines such as mono-ethanol amine and tri-ethanol amine; quaternary ammoniums such as tetramethylammonium hydroxide. Particularly, diisopropyl amine and diisobutyl amine are preferable. A molar ratio of an alkali component and antimony pentoxide in the abovementioned amine-containing antimony pentoxide colloid of 0.02-4.00 as $M/Sb_2O_5$ is preferable. If the molar ratio is lower than 0.02, an obtained colloid has poor stability. If the molar ratio is higher than 4.00, since water resistance of an obtained dried coating film using such a sol become lower, it is not preferable in practical use.

The amine-containing antimony pentoxide colloidal particles, the oligomer thereof or their mixture (B1) are microscopic antimony pentoxide colloidal particles, an oligomer thereof or their mixture. Colloid particles can be observed in less than or equal to 10 nm by electron-microscopic observation. Since an oligomer is a polymer, the oligomer cannot be observed by electron-microscopic observation.

In the present invention, a particle diameter of colloidal particles (A) is 2-100 nm, and a particle diameter of modified metal oxide particles (A1) coated with (B1) is 2.5-100 nm. This increment of the diameter is caused by generating a chemical bond on the surface of the positively charged colloidal particles (A) with the negatively charged colloidal particles, the oligomer thereof or their mixture (B1), and by coating thereby. In the present invention, since the chemical bond is generated on the particle surface, a sum of a particle diameter of nuclei particles and a particle diameter of coating particles is not always equal to a particle diameter of obtained modified particles, and the particle diameter of the obtained modified particles is partly varied by the chemical bonding.

Alkyl amines such as diisopropyl amine preferable as an amine component, and a molar ratio of amine/$Sb_2O_5$ is 0.02-4.00.

In addition, a sol containing this metal oxide particles (A1) is produced by continuing process (b1) which includes coating the particle surface of the sol containing metal oxide particles (A1) obtained by the process (a1) again with the containing $Sb_2O_5$ colloidal particles having a molar ratio of $M/Sb_2O_5$ (where M represents an amine molecule) of 0.02-4.00, the oligomer thereof or their mixture (B1), at a mass ratio of (B1)/(A) calculated as their metal oxide of less than or equal to 0.49, aging a resultant aqueous medium at 20-100° C. for 0.1-50 hours, and removing electrolyte from the solution. The sol containing metal oxide particles (A) has a pH 1-10.

A total coating amount of a coating amount of (B1) at the process (a1) and a coating amount of (B1) at the process (b1) is, as a ratio of (B1)/(A) calculated as their metal oxides, preferably 0.01-0.50.

The modified zirconium oxide-tin oxide composite colloidal particles (A1), the surface of which is coated with the amine-containing $Sb_2O_5$ colloidal particles (B1) according to the present invention, are negatively charged in the sol.

The above-mentioned zirconium oxide-tin oxide composite colloidal particles are positively charged, and the $Sb_2O_5$ colloid is negatively charged. Accordingly, it is assumed that the modified zirconium oxide-tin oxide composite colloidal particles are generated by pulling electrically the negatively charged $Sb_2O_5$ colloid around the positively charged zirconium oxide-tin oxide composite colloidal particles due to mixing, and by bonding the $Sb_2O_5$ colloid onto the surface of the positively charged colloidal particles by chemical bonding and coating the surface of the positively charged particles which act as nuclei, with the negatively charged $Sb_2O_5$ colloid.

However, when the zirconium oxide-tin oxide composite colloidal particles (A) having a particle diameter of 2-100 nm as a nuclei sol and the amine-containing $Sb_2O_5$ colloid, the oligomer thereof or their mixture (B1) as a coating sot are mixed, if the metal oxide of the coating sol is less than 1 part by mass to 100 parts by mass of the metal oxide ($ZrO_2+SnO_2$) of the nuclei sol a stable sol cannot be obtained. This means that insufficient amount of $Sb_2O_5$ colloid provides insufficient coating of the surface of the zirconium oxide-tin oxide composite colloidal particles which act as nuclei with the composite colloidal particles, and the obtained colloidal particles are easy to aggregate. Therefore, the obtained sol is unstable. Accordingly, an amount of $Sb_2O_5$ colloidal particles and the oligomer thereof which should be mixed may be less than an amount which can coat all of the surface of the zirconium oxide-tin oxide composite colloidal particles, but the amount is more than or equal to a minimum amount which can produce a stable sol of the modified zirconium oxide-tin oxide composite colloidal particles. When more amount of $Sb_2O_5$ colloidal particles, the oligomer thereof or their mixture than the amount used for the surface coating is used for the above-mentioned mixing, the obtained sol is merely a stable mixed sol of the aqueous medium containing $Sb_2O_5$ colloidal particles, the oligomer thereof or their mixture, and the sol of obtained modified zirconium oxide-tin oxide composite colloidal particles.

For modifying the zirconium oxide-tin oxide composite colloidal particles (A) by coating their surface, an amount of used $Sb_2O_5$ colloid, the oligomer thereof or their mixture (B1) is preferably less than or equal to 50 parts by mass in the process (a1) and less than or equal to 49 parts by mass in the process (b1) as the metal oxide in the coating sol to 100 parts by mass of the metal oxide ($ZrO_2+SnO_2$) of nuclei sol.

In the present invention, composite particles (B2) in which amine-containing silica particles are further added to the amine-containing antimony pentoxide colloidal particles, the oligomer thereof or their mixture may be used as a coating material.

That is, a sol can be used which contains modified metal oxide particles (AB2) formed by coating the surface of modified metal oxide particles (A1) as nuclei, formed by coating the surface of zirconium oxide-tin oxide composite colloidal particles (A) with amine-containing $Sb_2O_5$ colloidal particles, an oligomer thereof or their mixture (B1), with antimony pentoxide-silica composite colloidal particles, an oligomer thereof or their mixture (B2), in which a molar ratio of oxide in the zirconium oxide-tin oxide composite colloidal particles (A) is 0.02-0.4 as $SnO_2/ZrO_2$, and the zirconium oxide-tin oxide composite colloidal particles (A) have a structure in which zirconium oxide colloidal particles and tin oxide colloidal particles are bonded together, and a primary particle diameter of 2-100 nm, and the amine-containing $Sb_2O_5$ colloidal particles, the oligomer thereof or their mixture (B1) have a molar ratio of $M/Sb_2O_5$ (where M represents an amine molecule) of 0.02-4.00, and the modified metal oxide particles (A 1) have a mass ratio of (B1)/(A) of 0.01-0.50 based on a mass ratio of their metal oxides, and a particle diameter of 2.5-100 nm and the antimony pentoxide-silica composite colloidal particles, the oligomer thereof or their mixture (B2) have a molar ratio of $SiO_2/Sb_2O_5$ of 0.55-55, and the modified metal oxide particles (AB2) have a mass ratio of (B2)/(A1) of 0.01-0.50 based on a mass ratio of their metal oxides, and a particle diameter of 2.5-100 nm. The sol containing the metal oxide particles (AB2) has a pH of 1-10.

The sol is obtained by a production method including the process (a1), and thereafter process (b2) which includes mixing the sol containing amine-containing zirconium oxide-tin oxide composite colloidal particles (A1) obtained by the process (a1) with an aqueous medium of an antimony pentoxide-silica composite colloidal particles having a molar ratio of $SiO_2/Sb_2O_5$ of 0.55-55, an oligomer thereof or their mixture (B2), at a mass ratio of (B2)/(A1) calculated as their metal oxides of 0.01-0.50, aging a resultant aqueous medium at 20-100° C. for 0.1-50 hours, and removing electrolyte from the solution.

The antimony pentoxide-silica composite colloid, the oligomer thereof or their mixture (B2) used as a coating sol in the present invention can be obtained by known methods (for example, Japanese Patent Application Publication No. JP-B-50-40119) described below. That is, (B2) is obtained by decationizing with a cation-exchange resin after mixing an aqueous solution of an alkali silicate or silicic acid sol and an aqueous solution of an alkali antimonate.

Preferably, an aqueous solution of potassium antimonate may be used as a row material of antimony. Sodium silicate, potassium silicate and an activated silicic acid obtained by cation exchange may be used as a row material of silica. A molar ratio of $SiO_2/Sb_2O_5$ is 0.55-55.

The composite colloid of antimony pentoxide and silica, the oligomer thereof or their mixture (B2) is a microscopic composite colloid of antimony pentoxide and silica, an oligomer thereof or their mixture. Colloid particles can be observed in less than or equal to 5 nm by electron-microscopic observation. Since an oligomer is a polymer, the oligomer may not be observed by electron-microscopic observation in the present invention, a particle diameter of colloidal particles (A1) is 2.5-100 nm, and a particle diameter of modified metal oxide particles coated with (B2) is 2.5-100 nm. This increment of the diameter is caused by generating a chemical bond on the surface of the positively charged colloidal particles (A1) with the negatively charged colloidal particles, the oligomer thereof or their mixture (B2), and by coating thereby. In the present invention, since the chemical bond is generated on the particle surface, a sum of a particle diameter of nuclei particles and a particle diameter of coating particles is not always equal to a particle diameter of an obtained modified particles, and the particle diameter of an obtained modified particles is partly varied by the chemical bonding.

The modified zirconium oxide-tin oxide composite colloidal particles obtained by coating their surface with the composite colloid of antimony pentoxide and silica, the oligomer thereof or their mixture (B2) is negatively charged in the sol.

The above-mentioned zirconium oxide-tin oxide composite colloidal particles are positively charged and the composite colloid of antimony pentoxide and silica is negatively charged. Accordingly, it is assumed that the modified zirconium oxide-tin oxide composite colloidal particles are produced by pulling electrically the negatively charged composite colloid of antimony pentoxide and silica around the positively charged zirconium oxide-tin oxide composite colloidal particles due to mixing, and by bonding the composite colloid of antimony pentoxide and silica onto the surface of the positively charged colloidal particles by chemical bonding and coating the surface of the positively charged particles which act as nuclei with the negatively charged composite colloid of antimony pentoxide and silica.

However, when the zirconium oxide-tin oxide composite colloidal particles (A1) having a particle diameter of 2.5-100 nm as a nuclei sol and the composite colloidal particles of antimony pentoxide and silica, the oligomer thereof or their mixture (B2) as a coating sol are mixed, if the metal oxide of the coating sol is less than 1 past by mass to 100 parts by mass of the metal oxide ($ZrO_2+SnO_2$) of the nuclei sol a stable sol cannot be obtained. This means that insufficient amount of the composite colloidal particles of antimony pentoxide and silica provides insufficient coating of the surface of the zirconium oxide-tin oxide composite colloidal particles which act as nuclei with this composite colloidal particles, and the obtained colloidal particles are easy to aggregate. Therefore, the obtained sol is instable. Accordingly, an amount of the composite colloidal particles of antimony pentoxide and silica which should be mixed may be less than an amount which can coat all of the surface of the zirconium oxide-tin oxide composite colloidal particles, but the amount is more than or equal to a minimum amount which can produce a stable sot of the modified zirconium oxide-tin oxide composite colloidal particles. When more amount of the composite colloidal particles of antimony pentoxide and silica, the oligomer thereof or their mixture than the amount used for the surface coating is used for the above-mentioned mixing, the obtained sol is merely a mixed sol of an aqueous medium containing the composite colloidal particles of antimony pentoxide and silica, the oligomer thereof or their mixture, and the sol of obtained modified zirconium oxide-tin oxide composite colloidal particles.

For modifying the zirconium oxide-tin oxide composite colloidal particles by coating their surface, an amount of used composite sol of antimony pentoxide and silica, the oligomer thereof or their mixture (B2) is preferably less than or equal to 50 parts by mass as the metal oxide in the coating sol to 100 parts by mass of the metal oxide ($ZrO_2+SnO_2$) of the nuclei sol.

In the present invention, the tungsten oxide-tin oxide-silicon dioxide composite colloidal particles (B3) having a mass ratio of $WO_3/SnO_2$ of 0.1-100 and a mass ratio of $SiO_2/SnO_2$ of 0.1-100, and a particle diameter of 2-7 nm may be used as a coating material. That is, a sol may be used which contains modified metal oxide particles (AB3) formed by coating the surface of modified metal oxide particles (A1) as nuclei, formed by coating surf of a zirconium oxide-tin oxide composite colloidal particles (A) with amine-containing $Sb_2O_5$ colloidal particles, an oligomer thereof or their mixture (B1), with tungsten oxide-tin oxide-silicon dioxide composite colloidal particles (B3), in which a molar ratio of oxide in the zirconium oxide-tin oxide composite colloidal particles (A) is 0.02-0.4 as $SnO_2/ZrO_2$, and the zirconium oxide-tin oxide composite colloidal particles (A) have a structure in which zirconium oxide colloidal particles and tin oxide colloidal particles are bonded together, and a primary particle diameter of 2-100 nm, and the amine-containing $Sb_2O_5$ colloidal particles, the oligomer thereof or their mixture (B1) have a molar ratio of $M/Sb_2O_5$ (where M represents an amine molecule) of 0.02-4.00, and the modified metal oxide particles (A1) have a mass ratio of (B1)/(A) of 0.01-0.50 based on a mass ratio of their metal oxides, and a particle diameter of 2.5-100 nm, and the tungsten oxide-tin oxide-silicon dioxide composite colloidal particles (B3) have a mass ratio of $WO_3/SnO_2$ of 0.1-100 and a mass ratio of $SiO_2/SnO_2$ of 0.1-100, and a particle diameter of 2-7 nm, and the modified metal oxide particles (AB3) have a mass ratio of (B3)/(A1) of 0.02-1 based on a mass ratio of their metal oxides, and a particle diameter of 2.5-100 nm. The sol containing the metal oxide particles (AB3) has a pH of 1-10. In the present invention, since the chemical bond is generated on the particle surface, a sum of a particle diameter of nuclei particles and a particle diameter of coating particles is not always equal to a particle diameter of an obtained modified particles, and the particle diameter of an obtained modified particles is partly varied by the chemical bonding.

The sol is obtained by a production method including the process (a1), and thereafter process (b3) which includes preparing an aqueous solution containing tungstate, stannate and silicate having a mass ratio of $WO_3/SnO_2$ of 0.1-100 and a mass ratio of $SiO_2/SnO_2$ of 0.1-100, producing a tungsten oxide-tin oxide-silicon dioxide composite (B3) sol by removing cations exiting in the aqueous solution, mixing the aqueous sol of zirconium oxide-tin oxide composite (A1) obtained by the process (a1) and a tungsten oxide-tin oxide-silicon dioxide composite (B3) sol having a particle diameter of 2-7 nm, and a mass ratio of $WO_3/SnO_2$ of 0.1-100 and a mass ratio of $SiO_2/SnO_2$ of 0.1-100, at a mass ratio of (B3)/(A1) calculated as their metal oxides of 0.02-1, aging a resultant aqueous medium at 20-100° C. for 0.1-50 hours, and removing electrolyte from the solution.

The composite colloidal particles of $WO_3$, $SnO_2$ and $SiO_2$ contained in the tungsten oxide-tin oxide-silicon dioxide composite (B3) sol can be observed by electron-microscopic observation. A diameter of these particles is 1-50 nm, preferably 2-7 nm, and more preferably 2-5 nm. Both water and hydrophilic organic solvents can be used as dispersion media of the colloid particles of the sol. The sol contains $WO_3$, $SnO_2$ and $SiO_2$, whose mass ratio is 0.1-100 as $WO_3/SnO_2$ and is 0.1-100 as $SiO_2/SnO_2$. A total concentration of $WO_3$, $SnO_2$ and $SiO_2$ contained in the sol is usually less than or equal to 40% by mass, preferably more than or equal to 2% by mass in practical use, and preferably 5-30% by mass. The sol shows a pH of 1-9, and is a liquid having transparent and colorless state or slight colloidal color. In addition, the sol is stable during no less than 3 months at room temperature and during no less than 1 month at 60° C., and no precipitate is generated in the sol. Moreover, the sol shows no viscosity increase and no gelation.

A production method of a stable tungsten oxide-tin oxide-silicon dioxide composite sol containing a composite colloid of tungsten oxide ($WO_3$), tin oxide ($SnO_2$) and silicon dioxide ($SiO_2$) for use in the process (b3) includes process (b3-1) in which an aqueous solution containing a tungstate, a stannate and a silicate having a mass ratio of $WO_3/SnO_2$ of 0.1-100 and a mass ratio of $SiO_2/SnO_2$ of 0.1-100 is prepared, and process (b3-2) in which cation included in the aqueous solution obtained in the process (b3-1) is removed.

Examples of tungstates, stannates and silicates used in the process (b3-1) include tungstates, stannates and silicates of alkali metals, ammoniums and amines and the like. Preferable examples of alkali metals, ammoniums and amines include Li, Na, K, Rb, Cs, $NH_4$; alkyl armies such as ethyl amine, triethyl amine, isopropyl amine, n-propyl amine, isobutyl amine diisobutyl amine, di(2-ethylhexyl)amine; aralkyl amines such as benzyl amine; alicyclic amines such as piperidine; and alkanol amines such as mono-ethanol amine and tri-ethanol amine. Particularly, sodium tungstate ($Na_2WO_4 \cdot 2H_2O$), sodium stannate ($Na_2SnO_2 \cdot 3H_2O$) and sodium silicate (liquid glass) are preferable. In addition, a solution in which tungsten oxide, tungstic acid, stannic acid or silicic acid is dissolved into a solution of alkali metal hydroxides may be used. Moreover, amine silicates and quaternary ammonium silicates obtained by adding alkyl amines such as ethyl amine, triethyl amine, isopropyl amine, n-propyl amine, isobutyl amine, diisobutyl amine, di(2-ethylhexyl) amine to an activated silicic acid are also used as silicates.

Preparation methods of an aqueous solution in the process (b3-1) include a method of preparing an aqueous solution by dissolving each powder of a tungstate, a stannate and a silicate into water, a method of preparing an aqueous solution by mixing an aqueous solution of a tungstate, an aqueous solution of a stannate and an aqueous solution of a silicate; and a method of preparing an aqueous solution by adding powder of a tungstate and a sate, and an aqueous solution of a silicate to water.

Concentration of an aqueous solution of a tungstate used in the sol production in the process (b3-1) is preferably 0.1-15% by mass as $WO_3$. However, a solution having higher concentration compared with the preferable concentration is also usable.

Concentration of an aqueous solution of a silicate used in the sol production in the process (b3-1) is preferably 0.1-30% by mass as $SnO_2$. However, a solution having higher concentration compared with the preferable concentration is also usable.

Concentration of an aqueous solution of a silicate used in sol production in the present invention is preferably 0.1-30% by mass as $SiO_2$. However, a solution having higher concentration compared with the preferable concentration is also usable.

A preparation of the aqueous solution in the process (b3-1) is performed under room temperature to approximately 100° C., preferably room temperature to approximately 60° C. with agitation. A mass ratio of the metal oxides in the solution which should be mixed is preferably 0.1-100 as $WO_3/SnO_2$ and 0.1-100 as $SiO_2/SnO_2$.

In the process (b3-2), cation included in the aqueous solution obtained by the process (b3-1) is removed. Methods of decationization processes include a method of salting out and a method of containing with a hydrogen form ion exchanger. The hydrogen form cation exchanger used in the process is commonly used cation exchange resins. Commercially available cation exchange resins may be used conveniently.

When an aqueous sol obtained by the process (b3-1) and the process (b3-2) is low concentration, if desired, the concentration of the sol can be increased by usual condensation methods such as an evaporation method and an ultrafiltration method. Particularly, the ultrafiltration method is preferable. In the condensation process, also a temperature of the sol is preferably lower than or equal to 100° C., and particularly preferably lower than or equal to 60° C.

A hydrophilic organic solvent sol referred to as an organosol is obtained by replacing water in the aqueous sol obtained in the process (b3) to a hydrophilic organic solvent.

The tungsten oxide-tin oxide-silicon dioxide composite sol obtained in the process (b3) contains composite particles containing a tungsten oxide-tin oxide-silicon dioxide obtained by uniformly combining tungsten oxide, tin oxide and silicon dioxide in atomic scale (that is, solid solution). Accordingly, the organosol cannot be obtained by simply mixing a tungsten oxide sot, a tin oxide sol and a silicon dioxide sol.

Since the tungsten oxide-fin oxide-silicon dioxide composite particles form a solid solution in the tungsten oxide-tin oxide-silicon dioxide composite sol, the particles are not degraded into tungsten oxide particles, tin oxide particles and silicon dioxide particles by solvent replacement.

The tungsten oxide-tin oxide-silicon dioxide composite sol has improved properties such as water resistance, moisture resistance and weather resistance compared with the tungsten oxide-tin oxide composite sol, when a coating film is formed by coating them on a substrate.

When a mass ratio of $WO_3/SnO_2$ in the obtained sol is less than 0.1, the sol is unstable, and when the mass ratio is more than 100, the sol also does not show stabile state. An oxycarboxylic acid, which is added when the above-mentioned organosol is produced from a high pH aqueous sol, also contributes to stabilization of the sol. However, when an amount of an added oxycarboxylic acid exceeds 30% by mass to the total amount of $WO_3$, $SnO_2$ and $SiO_2$, water resistance of dried coating film obtained with such a sol is decreased. Examples of used oxycarboxylic acids include lactic acid, tartaric acid, citric acid, gluconic acid, malic acid and glycol. Examples of alkali components include alkali metal hydroxides such as Li, Na, K, Rb, Cs; ammonium such as $NH_4$, alkyl amines such as ethyl amine, triethyl amine, isopropyl amine and n-propyl amine; aralkyl amines such as benzyl amine; alicyclic amines such as piperidine; and alkanol amines such as mono-ethanol amine and tri-ethanol amine. These alkali components may be used in combination. In addition, alkali components may also be used together with the above-mentioned acid components. A pH of a sol varies according to an amount of substances such as alkali metals, ammoniums, amines and oxycarboxylic acids in the sol. When a pH of a sol is less than 1, the sol is unstable. When a pH of a sol is more than 9, tungsten oxide, tin oxide and silicon dioxide composite colloidal particles are easy to dissolve in the liquid. When a total concentration of $WO_3$, $SnO_2$ and $SiO_2$, is higher than or equal to 40% by mass, a sol is also unstable. When the concentration is too low, a sol is not practical. As an industrial product, preferred concentration of a sol is 5-30% by mass.

Use of ultrafiltration as a condensation method enables to eliminate polyanions, ultramicro particles and the like, which are the cause of sol instability, from a sol, because polyanions, ultramicro particles and the like coexisting in the sol pass through an ultrafiltration membrane with water.

A process includes mixing a zirconium oxide-tin oxide composite aqueous sol which is 100 parts by mass as total parts of $ZrO_2$ and $SnO_2$ contained in the zirconium oxide-tin oxide composite aqueous sol, and a tungsten oxide-tin oxide-silicon dioxide composite sol which is 2-100 parts by mass as total parts of $WO_3$, $SnO_2$ and $SiO_2$ contained in the tungsten oxide-tin oxide-silicon dioxide composite sol and has a particle diameter of 2-7 nm, mass ratio of $WO_3/SnO_2$ of 0.1-100 and mass ratio of $SiO_2/SnO_2$ of 0.1-100 at 0-100° C.

By bonding colloidal particles (B3) of the tungsten oxide-tin oxide-silicon dioxide composite sol on the surface of colloidal particles of the zirconium oxide-tin oxide composite sol (A1), the surface is coated with the above-mentioned colloidal particles of the tungsten oxide-tin oxide-silicon dioxide composite sol. By this coating, the zirconium oxide-tin oxide composite colloidal particles (AB3), in which the colloidal particles act as nuclei and the surface is modified as having properties of a tungsten oxide-tin oxide silicon dioxide composite, can be produced. In addition, the modified zirconium oxide-tin oxide composite colloidal particles can be obtained as a sol stably dispersed in a liquid medium.

A sol of these zirconium oxide-tin oxide composite colloidal particles (AB3) modified with tungsten oxide-tin oxide-silicon dioxide composite colloidal particles (B3) is obtained by a process of mixing the zirconium oxide-tin oxide composite sot which is 100 parts by mass as its metal oxides ($ZrO_2+SnO_2$) with the tungsten oxide tin oxide-silicon dioxide composite sol which is 2-100 parts by mass as total parts of $WO_3$, $SnO_2$ and $SiO_2$ in the sol, preferably under vigorous agitation, and then by a process of removing anion in the sol from the mixed sol.

The modified zirconium oxide-tin oxide composite colloidal particles (AB3) in the sol obtained by the mixing in the above-mentioned processes can be observed by electron microscopic observation, and the colloidal particles have a diameter of approximately 2.5-100 nm. The sol obtained by the above-mentioned mixing has a pH of approximately 1-10. However, the colloidal particles cause micro-aggregation and the sol has lower transparency, because the sot contains much anion such as $Cl^-$, $NO_3^-$ and $CH_3COO^-$ derived from oxyzirconium salts used for modification.

By removing the anion in the sol obtained by the above-mentioned mixing, a stable sol of modified zirconium oxide-tin oxide composite colloidal particles having a pH of 3-10 and excellent transparency can be obtained Anion removal is achieved by processing the sol obtained by the above-mentioned mixing with a hydroxyl form anion exchange resin at lower than or equal to 100° C., preferably at room temperature to approximately 60° C. Commercially available anion exchange resin may be used, and a strong base form anion exchange resin such as Amberlite 410 is preferable.

Particularly, the process using a hydroxyl form anion exchange resin is preferably performed at the metal oxide concentration of the sol obtained by the above-mentioned mixing of the previous process of 1-10% by mass.

When the further increase in concentration of the obtained modified zirconium oxide-tin oxide composite colloidal particles is desired, the condensation can be achieved up to approximately 50% by mass at maximum with usual methods such as, for example, an evaporation method and an ultrafiltration method. In addition, when adjustment of the pH of the sol is desired, the adjustment can be achieved by adding hydroxides of the above-mentioned alkali metals and ammoniums, and the above-mentioned amines and oxycarboxylic acids to the sol after condensation. Practically, a sol having a total concentration of the above-mentioned metal oxides ($ZrO_2+SnO_2$) and ($WO_3+SnO_2+SiO_2$) of 10-40% by mass is preferable.

The surface of colloidal particles in the modified zirconium oxide-tin oxide composite sol is partially or completely coated with silane compounds such as ethyl silicate, methyltrimethoxy silane, γ-glycidoxy-propyl-trimethoxy silane and a hydrolyzed substances thereof.

In a case where the modified zirconium oxide-tin oxide composite sol obtained by the above-mentioned mixing is an aqueous sol, an organosol is obtained by replacing water medium of the aqueous sol to hydrophilic organic solvent. The replacement may be performed by usual methods such as a distillation method and an ultrafiltration method. Examples of hydrophilic organic solvents include lower alcohols such as methyl alcohol, ethyl alcohol and isopropyl alcohol; linear amides such as dimethyl formamide and N,N'-methyl acetamide; cyclic amides such as N-methyl-2-pyrrolidone; and glycols such as ethyl cellosolve and ethylene glycol.

The above-mentioned replacement of water by a hydrophilic organic solvent is easily performed by usual method such as a distillation replacement method and an ultrafiltration method.

The modified zirconium oxide-tin oxide composite colloidal particles, the surface of which is coated with the tungsten oxide-tin oxide-silicon dioxide composite colloidal particles of the present invention, are negatively charged in the sol. The above-mentioned zirconium oxide-tin oxide composite colloidal particles are positively charged, and the tungsten oxide-tin oxide-silicon dioxide composite colloidal particles are negatively charged. Accordingly, it is assumed that the modified zirconium oxide-tin oxide composite colloidal particles are generated by puling electrically the negatively charged tungsten oxide-tin oxide-silicon dioxide composite colloidal particles around the positively charged zirconium oxide-tin oxide composite colloidal particles due to mixing of the process (b3), and by bonding the tungsten oxide-tin oxide-silicon dioxide composite colloidal particles onto the surface of the positively charged colloidal particles by chemical bonding and coating the surface of the positively charged particles which act as nuclei, with the tungsten oxide-tin oxide-silicon dioxide composite.

However, when the zirconium oxide-tin oxide composite colloidal particles having a particle diameter of 2.5-100 nm as a nuclei sol and the tungsten oxide-tin oxide-silicon dioxide composite colloidal particles as a coating sol are mixed, if the tool amount of metal oxides ($WO_3+SnO_2+SiO_2$) of the coating sol is less than 2 parts by mass to 100 parts by mass of the metal oxides ($ZrO_2+SnO_2$) of the nuclei sol, a stable sol cannot be obtained. This means that insufficient amount of the tungsten oxide-tin oxide-silicon dioxide composite colloidal particles provides insufficient coating of the surface of the zirconium oxide-tin oxide composite colloidal particles which act as nuclei with this composite colloidal particles, and the obtained colloidal particles are easy to aggregate. Therefore, the obtained sol is unstable. Accordingly, an amount of the tungsten oxide-tin oxide-silicon dioxide composite colloidal particles which should be mixed may be less than an amount which can coat all of the surface of the zirconium oxide-tin oxide composite colloidal particles, but the amount is more than or equal to a minimum amount which can produce a stable sol of the modified zirconium oxide-tin oxide composite colloidal particles. When more amount of the tungsten oxide-tin oxide-silicon dioxide composite colloidal particles than the amount used for the surface coating is used for the above-mentioned mixing, the obtained sol is merely a stable mixed sol of the sol of the tungsten oxide-tin oxide-silicon dioxide composite colloidal particles and the sol of the obtained modified zirconium oxide-tin oxide composite colloidal particles.

For modifying the zirconium oxide-tin oxide composite colloidal particles by coat their surface, an amount of the used tungsten oxide-tin oxide-silicon dioxide composite colloidal particles is preferably less than or equal to 100 parts by mass as total amount of metal oxides ($WO_3+SnO_2+SiO_2$) in the coating sol to 100 parts by mass of metal oxides ($ZrO_2+SnO_2$) in the nuclei sol.

A preferable aqueous composite sol of the modified zirconium oxide-tin oxide according to the present invention has a pH of 3-11. When the pH of the sol is lower than 3, such a sol is tend to unstable. When the pH of the sol is higher than 11, the tungsten oxide-tin oxide-silicon dioxide composite coated on the modified zirconium oxide-tin oxide composite colloidal particles are easy to dissolve in the liquid. In addition, when a total concentration of ($ZrO_2+SnO_2$) and ($WO_3+SnO_2+SiO_2$) is higher than or equal to 50% by mass, a sol is also unstable. As an industrial product, preferred concentration of a sol is approximately 10-40% by mass.

Since the tungsten oxide-tin oxide-silicon dioxide composite colloidal particles are easy to hydrolyze in high temper-e operations such as mixing, anion exchange and condensation thereafter, pH adjustment and solvent replacement are preferably performed at lower than or equal to 100° C.

In the present invention, as a nuclei sol, a sol containing modified metal oxide particles (A1) may be used which includes process (a2) including coating the particle surface of the sol containing zirconium oxide-tin oxide composite colloidal particles (A) obtained by the process (a) with amine-containing $Sb_2O_5$ colloidal particles having a molar ratio of $M/Sb_2O_5$ (where M represents an amine molecule) of 0.02-4.00, an oligomer thereof or their mixture (B1), at a mass ratio of (B1)/(A) calculated as their metal oxide of 0.01-0.50, aging a resultant aqueous medium at 20-100° C. for 0.1-50 hours, removing electrolyte from the solution, and then treating hydrothermally at 200-300° C. for 0.1-50 hours. The sol containing the modified metal oxide particles (A1) has a pH of 1-10.

The sol containing the metal oxide particles (A1) is obtained by a hydrothermal treatment at 200-300° C. with autoclave apparatus and the like. By the hydrothermal treatment, the sol having the metal oxide particles (A1) as nuclei has high crystallinity, so that the improvement of a refractive index of a coating film is achieved when the sol is used for a coating agent.

From the sol containing hydrothermally treated metal oxide particles (A1), modified sols of (A1), (AB2) and (AB3) can be obtained by coating the metal oxide particles (A1) as nuclei with the above-mentioned same coating materials (B1), (B2) and (B3).

A sol containing the above-mentioned modified metal oxide particles (A1) is obtained by a production method including the process (a2), and thereafter process (b1) which includes coating the particle surface of the sol containing amine-containing zirconium oxide-tin oxide composite colloidal particles (A1) obtained by the process (a2) with the amine-containing $Sb_2O_5$ colloidal particles having a molar ratio of $M/Sb_2O_5$ (where M represents an amine molecule) of 0.02-4.00, the oligomer thereof or their mixture (B1), at a mass ratio of (B1)/(A1) calculated as their metal oxides of 0.01-0.49, aging a resultant aqueous medium at 20-100° C. for 0.1-50 hours, and removing electrolyte from the solution. The sol containing the metal oxide particles (A1) has a pH of 1-10.

A sol containing the above-mentioned modified metal oxide particles (AB2) is obtained by a production method including the process (a2), and thereafter process (b2) which includes mixing the sol containing amine-containing zirconium oxide-tin oxide composite colloidal particles (A1) obtained by the process (a2) with an aqueous medium of an antimony pentoxide-silica composite colloidal particles having a molar ratio of $SiO_2/Sb_2O_5$ of 0.55-55, an oligomer thereof or the mixture B2), at a mass ratio of (B2)/(A1) calculated as their metal oxides of 0.01-0.50, aging a resultant aqueous medium at 20-100° C. for 0.1-50 hours, and removing electrolyte from the solution. The sol containing the metal oxide particles (AB2) has a pH of 1-10.

A sol containing the above-mentioned modified metal oxide particles (AB3) is obtained by a production method including the process (a2), and thereafter process (b3) which includes preparing an aqueous solution containing tungstate, stannate and silicate having a mass ratio of $WO_3/SnO_2$ of 0.1-100 and a mass ratio of $SiO_2/SnO_2$ of 0.1-100, producing a tungsten oxide-tin oxide-silicon dioxide composite (B3) sol by removing cation exiting in the aqueous solution, mixing the aqueous sol of the zirconium oxide-tin oxide composite obtained by the process (a2) and a tungsten oxide-tin oxide-silicon dioxide composite (B3) sol having a particle diameter of 2-7 nm, and a mass ratio of $WO_3/SnO_2$ of 0.1-100 and a mass ratio of $SiO_2/SnO_2$ of 0.1-100, at a mass ratio of (B3)/(A1) calculated as their metal oxides of 0.02-1, aging a resultant aqueous medium at 20-100° C. for 0.1-50 hours and removing electrolyte from the solution. The sol containing the metal oxide particles (AB3) has a pH of 1-10.

A coating composition made from particles of the sol of the present invention used as nuclei is applied to a substrate and calcined, and the resultant coated film has a high refractive index (a refractive index calculated from the coating is 1.7-1.8) and excellent transparency. In addition, the coated film has excellent weather resistance and light resistance due to composite foxing of zirconium oxide with other particles.

In addition, each of the above-mentioned sols has a case where the zirconium oxide-tin oxide composite particles (A1) are processed with an autoclave up to 200° C. or a case where the zirconium oxide-tin oxide composite particles (A1) are processed with an autoclave up to 300° C. For the particles treated by the latter treatment, a coating film in which a coating composition obtained from the sol is applied to a substrate and calcined has a high refractive index (a refractive index calculated from the coating is 1.8-1.9), with having an excellent properties of the sol treated by the former process.

The above-mentioned modified zirconium oxide-tin oxide composite colloidal particles can be observed by electron microscopic observation, and the colloidal particles have a diameter of approximately 2.5-100 nm. The sol obtained by the above-mentioned mixing has a pH of approximately 1-10. However, the colloidal particles cause micro-aggregation and the sol has lower transparency, because the sol contains much anion such as $Cl^-$, $NO_3^-$ and $CH_3COO^-$ derived from oxyzirconium salts used for modification.

By removing the anion in the sol obtained by the above-mentioned mixing, a stable sol of modified zirconium oxide-tin oxide composite colloidal particles having a pH of 3-11.5 and excellent transparency can be obtained.

Anion removal is achieved by processing the sol obtained by the above-mentioned mixing with a hydroxyl form anion exchange resin at lower than or equal to 100° C., preferably at room temperature (approximately 20° C.) to approximately 60° C. A commercially available hydroxyl form anion exchange resin may be used for the hydroxyl form anion exchange resin, and strong base form anion exchange resin such as Amberlite 410 is preferable.

Particularly, the process with a hydroxyl form anion exchange resin is preferably performed at the metal oxide concentration of the sol obtained by the mixing of 1-10% by mass.

A preferable aqueous composite sol of the modified zirconium oxide-tin oxide according to the present invention can be adjusted to a pH of 1.5-11.5. When the pH of the sol is higher than 11.5, the coating colloidal particles coated on the modified tin oxide colloidal particles and the modified zirconium oxide-tin oxide composite colloidal particles are easy to dissolve in the liquid. When a total concentration of total metal oxides in the sol of zirconium oxide-tin oxide composite colloidal particles is higher than or equal to 60% by mass, a sol is also unstable. As an industrial product, preferred concentration of the sol is approximately 10-50% by mass.

The modified metal oxide sol of the present invention may contain other optional components, insofar as attaining an object of the present invention. Particularly, when oxycarboxylic acids is added to less than or equal to approximately 30% by mass to a total amount of the total metal oxides, a colloid whose properties such as dispersibility are further improved is obtained.

When a coating composition is obtained by mixing silane coupling agents such as γ-glycidoxy-trimethoxy silane or a hydrolysate thereof to the sol of the modified metal oxides of the present invention, since a silane coupling agent or a hydrolysate thereof has mild acidity, a pH of the sol may be previously lowered by adding an oxycarboxylic acid to the modified metal oxide sol of the present invention. In this case, a pH of the modified metal oxide sol is 4-6. By this treatment, an affinity of the modified metal oxide particles and the silane coupling component in the coating composition is improved, and coat characteristics and storage stability of the coating composition are also improved.

Examples of used oxycarboxylic acids include lactic acid, tartaric acid, citric acid, gluconic acid, malic acid and glycolic acid. In addition, alkali components may be contained. Examples of alkali components include alkali metal hydroxides such as Li Na, K, Rb, Cs; ammonium such as $NH_4$; alkyl armies such as ethyl amine, triethyl amine, isopropyl amine and n-propyl amine; aralkyl amines such as benzyl amine; alicyclic amines such as piperidine; and alkanol amines such as mono-ethanol amine and tri-ethanol amine. These alkali components may be used singly or in combination. In addition, alkali components may also be used together with the above-mentioned acid components. These components may be contained less than or equal to approximately 30% by mass to a total amount of the total metal oxides.

When the further increase in concentration of the sol is desired, the condensation can be achieved up to 50% by mass at maximum with usual methods such as, for example, an evaporation method and an ultrafiltration method. In addition, when adjustment of the pH of the sol is desired, the adjustment can be achieved by adding the abovementioned alkali metals, organic base (amines) and oxycarboxylic acids to the sol after condensation. Particularly, a sol having a total concentration of the metal oxides of 10-40% by mass is practically preferable. Use of ultrafiltration as a condensation method enables to eliminate polyanions, ultramicro particles and the like, which are the cause of sol instability, from a sot, because polyanions, ultramicro particles and the like coexisting in the sol pass through an ultrafiltration membrane with water.

In a case where the modified metal oxide colloid obtained by the above mentioned mixing is an aqueous sol, an organosol is obtained by replacing water medium of the aqueous sot to a hydrophilic organic solvent. The replacement may be performed by usual methods such as distillation method and ultrafiltration method. Examples of hydrophilic organic solvents include lower alcohols such as methyl alcohol, ethyl alcohol and isopropyl alcohol; linear amides such as dimethyl formamide and N,N'-dimethyl acetamide; cyclic amides such as N-methyl-2-pyrrolidone; and glycols such as ethyl cellosolve and ethylene glycol, In Formula (I):

$$(R^1)_a(R^3)_b Si(OR^2)_{4-(a+b)} \quad (I)$$

in a component (S) used for a coating compositions of the present invention, an organic silicon compound in which $R^1$ and $R^3$ are the same organic group or a different organic group, and in which a and b are the same integer or a different integer is included. Examples of an organic silicon compound represented in Formula (I) in the above-mentioned component (A) include tetramethoxy silane, tetraethoxy silane, tetra-n-propoxy silane, tetra-isopropoxy silane, tetra-n-butoxy silane, tetraacetoxy silane, methyl trimethoxy silane, methyl tripropoxy silane, methyl triacetoxy silane, methyl tributoxy silane, methyl tripropoxy silane, methyl triamiloxy silane, methyl triphenoxy silane, methyl tribenzyloxy silane, methyl triphenethyloxy silane, glycidoxy methyl trimethoxy silane, glycidoxy methyl triethoxy silane, α-glycidoxy ethyl trimethoxy silane, α-glycidoxy ethyl triethoxy silane, β-glycidoxy ethyl trimethoxy silane, β-glycidoxy ethyl triethoxy silane, α-glycidoxy propyl trimethoxy silane, α-glycidoxy propyl triethoxy silane, β-glycidoxy propyl trimethoxy silane, β-glycidoxy propyl triethoxy silane, γ-glycidoxy propyl trimethoxy silane, γ-glycidoxy propyl triethoxy silane, γ-glycidoxy propyl tripropoxy silane, γ-glycidoxy propyl tributoxy silane, γ-glycidoxy propyl triphenoxy silane, α-glycidoxy butyl trimethoxy silane, α-glycidoxy butyl triethoxy silane, β-glycidoxy butyl triethoxy silane, γ-glycidoxy butyl trimethoxy silane, γ-glycidoxy butyl triethoxy silane, δ-glycidoxy butyl trimethoxy silane, δ-glycidoxy butyl triethoxy silane, (3,4-epoxycyclohexyl)methyl trimethoxy silane, (3,4-epoxycyclohexyl)methyl triethoxy silane, β-(3,4-epoxycyclohexyl)ethyl trimethoxy silane, β-(3,4-epoxycyclohexyl) ethyl triethoxy silane, β-(3,4-epoxycyclohexyl)ethyl tripropoxy silane, β-(3,4-epoxycyclohexyl)ethyl tributoxy silane, β-(3,4-epoxycyclohexyl)ethyl triphenoxy silane, γ-(3, 4-epoxycyclohexyl)propyl trimethoxy silane, γ-(3,4-epoxycyclohexyl)propyl triethoxy silane, δ-(3,4-epoxycyclohexyl) butyl trimethoxy silane, δ-(3,4-epoxycyclohexyl)butyl triethoxy silane, glycidoxy methyl methyl dimethoxy silane, glycidoxy methyl methyl diethoxy silane, α-glycidoxy ethyl methyl dimethoxy silane, α-glycidoxy ethyl methyl diethoxy silane, β-glycidoxy ethyl methyl dimethoxy silane, β-glycidoxy ethyl ethyl dimethoxy silane, α-glycidoxy propyl methyl dimethoxy silane, α-glycidoxy propyl methyl diethoxy silane, β-glycidoxy propyl methyl dimethoxy silane, β-glycidoxy propyl ethyl dimethoxy silane, γ-glycidoxy propyl methyl dimethoxy silane, γ-glycidoxy propyl methyl diethoxy silane, γ-glycidoxy propyl methyl dipropoxy silane, γ-glycidoxy propyl methyl dibutoxy silane, γ-glycidoxy propyl methyl diphenoxy silane, γ-glycidoxy propyl ethyl dimethoxy silane, γ-glycidoxy propyl ethyl diethoxy silane, γ-glycidoxy propyl vinyl dimethoxy silane, γ-glycidoxy propyl vinyl diethoxy silane, ethyl trimethoxy silane, ethyl triethoxy silane, vinyl trimethoxy silane, vinyl triethoxy silane, vinyl triacetoxy silane, phenyl trimethoxy silane, phenyl triethoxy silane, phenyl triacetoxy silane, γ-chloro "propyl trimethoxy silane, γ-chloro propyl triethoxy silane, γchloro propyl triacetoxy" silane, 3,3,3-trifluoro propyl trimethoxy silane, γ-methacryloxy propyl trimethoxy silane, γ-mercapto propyl trimethoxy silane, γ-mercapto propyl triethoxy silane, β-cyano ethyl triethoxy silane, chloro methyl trimethoxy silane, chloro methyl triethoxy silane, N-(β-aminoethyl) γ-aminopropyl trimethoxy silane, N-(β-aminoethyl) γ-aminopropyl methyl dimethoxy silane, γ-aminopropyl methyl dimethoxy silane, N-(β-aminoethyl) γ-aminopropyl triethoxy silane, N-(β-aminoethyl) γ-aminopropyl methyl diethoxy silane, dimethyl dimethoxy silane, phenyl methyl diethoxy silane, dimethyl diethoxy silane, phenyl methyl diethoxy silane, γ-chloro propyl methyl dimethoxy silane, γ-chloro propyl methyl diethoxy silane, dimethyl diacetoxy silane, γ-methacryloxy propyl methyl dimethoxy silane, γ-methacryloxy propyl methyl diethoxy silane, γ-mercapto propyl methyl dimethoxy silane, γ-mercapto methyl diethoxy silane, methyl vinyl dimethoxy silane, and methyl vinyl diethoxy silane. Those silicon compounds may be used singly or in combination.

In addition, hydrolysates of organic silicon compounds represented by Formula (I) in the component (S) used for the coating compositions of the present invention turn into compounds whose above-mentioned $R^2$ is partially or totally substituted with hydrogen atoms by hydrolyzing the organic silicon compounds represented by Formula (I). These hydrolysates of organic silicon compounds represented by Formula (I) may be used singly or in combination. Hydrolysis is performed by adding an acidic aqueous solution such as hydrochloric acid aqueous solution, sulfuric acid aqueous solution and acetic acid aqueous solution into the above-mentioned silicon compounds with agitation.

Organic silicon compounds represented by Formula (II):

$$[(R^4)_c Si(OX)_{3-c}]_2 Y \qquad (II)$$

in the component (S) used for the coating composition of the present invention include methylene-bis(methyl dimethoxy) silane, ethylene-bis(ethyl dimethoxy) silane, propylene-bis(ethyl diethoxy)silane, and butylenes-bis(methyl diethoxy) silane. These compounds may be used singly or in combination.

In addition, hydrolysates of organic silicon compounds represented by Formula (II) in the component (S) used for the coating compositions of the present invention turn into compounds whose above-mentioned X is partially or totally substituted with hydrogen atoms by hydrolyzing the organic silicon compounds represented by Formula (II). These hydrolysates of organic silicon compounds represented by Formula (II) may be used singly or in combination. Hydrolysis is performed by adding an acidic aqueous solution such as hydrochloric acid aqueous solution, sulfuric acid aqueous solution and acetic acid aqueous solution into the above-mentioned silicon compounds with agitation.

The component (S) used for a coating composition of the present invention is at least one silicon-containing substance selected from a group consisting of organic silicon compounds represented by Formula (I) and Formula (II) and hydrolysates thereof.

The component (S) used for a coating composition of the present invention is preferably at least one silicon-containing substance selected from a group consisting of organic silicon compounds represented by Formula (I) and hydrolysates thereof. Particularly, organic silicon compounds represented by Formula (I) and hydrolysates thereof in which either $R^1$ or $R^3$ is an organic group having epoxy group; $R^2$ is an alkyl group; and each of a and b is equal to 0 or 1 and a+b is equal to 1 or 2, are preferable. Examples of preferable organic silicon compounds include glycidoxy methyl trimethoxy silane, glycidoxy methyl triethoxy silane, α-glycidoxy ethyl trimethoxy silane, α-glycidoxy ethyl triethoxy silane, β-glycidoxy ethyl trimethoxy silane, β-glycidoxy ethyl triethoxy silane, α-glycidoxy propyl trimethoxy silane, α-glycidoxy propyl triethoxy silane, β-glycidoxy propyl trimethoxy silane, β-glycidoxy propyl triethoxy silane, γ-glycidoxy propyl trimethoxy silane, γ-glycidoxy propyl triethoxy silane, γ-glycidoxy propyl tripropoxy silane, γ-glycidoxy propyl tributoxy silane, γ-glycidoxy propyl triphenoxy silane, α-glycidoxy butyl trimethoxy silane, α-glycidoxy butyl triethoxy silane, β-glycidoxy butyl triethoxy silane, γ-glycidoxy butyl trimethoxy silane, γ-glycidoxy butyl triethoxy silane, δ-glycidoxy butyl trimethoxy silane, δ-glycidoxy butyl triethoxy silane, glycidoxy methyl methyl dimethoxy silane, glycidoxy methyl methyl diethoxy silane, α-glycidoxy ethyl methyl dimethoxy silane, α-glycidoxy ethyl methyl diethoxy silane, β-glycidoxy ethyl methyl dimethoxy silane, β-glycidoxy ethyl ethyl dimethoxy silane, α-glycidoxy propyl methyl dimethoxy silane, α-glycidoxy propyl methyl diethoxy silane, β-glycidoxy propyl methyl dimethoxy silane, β-glycidoxy propyl ethyl dimethoxy silane, γ-glycidoxy propyl methyl dimethoxy silane, γ-glycidoxy propyl methyl diethoxy silane, γ-glycidoxy propyl methyl dipropoxy silane, γ-glycidoxy propyl methyl dibutoxy silane γ-glycidoxy propyl methyl diphenoxy silane, γ-glycidoxy propyl ethyl dimethoxy silane, γ-glycidoxy propyl ethyl diethoxy silane, γ-glycidoxy propyl vinyl dimethoxy silane, and γ-glycidoxy propyl vinyl diethoxy silane.

γ-glycidoxy propyl trimethoxy silane, γ-glycidoxy propyl methyl diethoxy silane. γ-glycidoxy propyl methyl dimethoxy silane and the hydrolysates thereof are more preferable. These compounds may be used singly or in combination. In addition, γ-glycidoxy propyl trimethoxy silane. γ-glycidoxy propyl methyl diethoxy silane and the hydrolysates thereof may be used together with additional tetrafunctional compounds corresponding to a+b=0 in Formula (I). Examples of tetrafunctional compounds include tetramethoxy silane, tetraethoxy silane, tetra (isopropoxy)silane, tetra (n-propoxy)silane, tetra (n-butoxy)silane, tetra (tert-butoxy) silane and tetra (sec-butoxy)silane.

As a fundamental raw material sol, a sol containing zirconium oxide-tin oxide composite colloidal particles (A), in which the zirconium oxide-tin oxide composite colloidal particles (A) have a molar ratio of 0.02-0.4 as $SnO_2/ZrO_2$, a structure in which zirconium oxide colloidal particles and tin oxide colloidal particles are bonded together, and a primary particle diameter of 2-100 nm is used for a component (T1) of a coating composition of the present invention. The above-mentioned sol may be used for this sol containing the zirconium oxide-tin oxide composite colloidal particles (A).

In addition, as a component (T2) of a coating composition of the present invention, a sol may be used which contains modified metal oxide particles (A1) formed by coating the surface of zirconium oxide-tin oxide composite colloidal particles (A) as nuclei with amine-containing $Sb_2O_5$ colloidal particles, an oligomer thereof or their mixture (B1), in which a molar ratio of oxide in the zirconium oxide-tin oxide composite colloidal particles (A) is 0.02-0.4 as $SnO_2/ZrO_2$, and the zirconium oxide-tin oxide composite colloidal particles (A) have a structure in which zirconium oxide colloidal particles and tin oxide colloidal particles are bonded together, and a primary particle diameter of 2-100 nm, and the amine-containing $Sb_2O_5$ colloidal particles, the oligomer thereof or their mixture (1) have a molar ratio of $M/Sb_2O_5$ (where M represents an amine molecule) of 0.02-4.00, and the modified metal oxide particles (A1) have a mass ratio of (B1)/(A) of 0.01-0.50 based on a mass ratio of their metal oxides, and a particle diameter of 2.5-100 nm. The above-mentioned sol may be used for this sot containing the modified metal oxide particles (A1).

Moreover, as a component (T3) of a coating composition of the present invention, a sol may be used which contains modified metal oxide particles (AB2) formed by coating the surface of modified metal oxide particles (A1) as nuclei, formed by coating the surface of zirconium oxide-tin oxide composite colloidal particles (A) with amine-containing $Sb_2O_5$ colloidal particles, an oligomer thereof or their mixture (B1), with antimony pentoxide-silica composite colloidal particles, an oligomer thereof or their mixture (B2), in which a molar ratio of oxide in the zirconium oxide-tin oxide composite colloidal particles (A) is 0.02-0.4 as $SnO_2/ZrO_2$, and the zirconium oxide-tin oxide composite colloidal particles (A) have a structure in which zirconium oxide colloidal particles and tin oxide colloidal particles are bonded together, and a primary particle diameter of 2-100 nm, and the amine-containing $Sb_2O_5$ colloidal particles, the oligomer thereof or their mixture (B1) have a molar ratio of $M/Sb_2O_5$ (where M represents an amine molecule) of 0.02-4.00, and the modified metal oxide particles (A1) have a mass ratio of (B1)/(A) of 0.01-0.50 based on a mass ratio of their metal oxides, and a particle diameter of 2.5-100 nm, and the antimony pentoxide-silica composite colloidal particles, the oligomer thereof or their mixture (B2) have a molar ratio of $SiO_2/Sb_2O_5$ of 0.55-55, and the modified metal oxide particles (AB2) have a mass ratio of (B2)/(A1) of 0.01-0.50 based on a mass ratio of their metal oxides, and a particle diameter of 2.5-100 nm. The above-mentioned sol may be used for this sol containing the modified metal oxide particles (AB2).

Furthermore, as a component (T4) of a coating composition of the present invention, a sol may be used which contains modified metal oxide particles (AB3) formed by coating the surface of modified metal oxide particles (A1) as nuclei, formed by coating the suit of zirconium oxide-tin oxide composite colloidal particles (A) with amine-containing $Sb_2O_5$ colloidal particles, an oligomer thereof or their mixture (B1), with tungsten oxide-tin oxide-silicon dioxide composite colloidal particles (B3), in which a molar ratio of oxide in the zirconium oxide-tin oxide composite colloidal particles (A) is 0.02-0.4 as $SnO_2/ZrO_2$, and the zirconium oxide-tin oxide composite colloidal particles (A) have a structure in which zirconium oxide colloidal particles and tin oxide colloidal particles are bonded together, and a primary particle diameter of 2-100 nm, and the amine-containing $Sb_2O_5$ colloidal particles, the oligomer thereof or their mixture (B1) have a ratio of $M/Sb_2O_5$ (where M represents an amine molecule) of a molar ratio of 0.02-4.00, and the modified metal oxide particles (A1) have a mass ratio of (B1)/(A) of 0.01-0.50 b on amass ratio of their metal oxides, and a particle diameter of 2.5-100 nm, and the tungsten oxide-tin oxide-silicon dioxide composite colloidal particles (B3) have a mass ratio of $WO_3/SnO_2$ of 0.1-100 and a mass ratio of $SiO_2SnO_2$ of 0.1-100, and a particle diameter of 2-7 nm, and the modified metal oxide particles (AB3) have a mass ratio of (B3)/(A1) of 0.02-1 based on a mass ratio of their metal oxides, and a particle diameter of 2.5-100 nm. The above-mentioned sol may be used for this sol containing the modified metal oxide particles (AB3).

A coating composition of the present invention is obtained by mixing the component (T1), (T2), (T3) or (T4) having a mass ratio of 1-500 part(s) by mass calculated as metal oxides thereof to the component (S) of 100 parts by mass. If an amount of the mixed component (T1), (T2), (T3) or (T4) is less than 1 part by mass, a resultant cured coating has a low refractive index, so that an application scope to substrates is particularly limited. If an amount of the mixed component (T1), (T2), (T3) or (T4) is more than 500 parts by mass, cracks and other defects will be easily generated between a cured coating and a substrate. In addition, a possibility of transparency decrease will increase.

A coating composition of the present invention may contain curing agents for accelerating reaction, particulate metal oxides for adjusting a refractive index of a cured coating to a refractive index of lenses acting as various substrates, and various surfactants for improving surface wettability at application of the coating composition and smoothness of a cured coating. Moreover, ultraviolet absorbers, antioxidants and the like may be added to the coating composition of the present invention insofar as the cured coating will not change its properties.

Examples of the above-mentioned curing agents include amines such as allyl amine, ethyl amine; acids and bases containing Lewis acids and Lewis bases, such as salts or metal salts of organic carboxyl acids, chromic acid, hypochlorous acid, boric acid, perchloric acid, bromic acid, selenious acid, thiosulfuric acid, orthosilicic acid, thiocyanic acid, nitrous acid, aluminic acid, carbonic acid; and metal alcoxides of aluminum, zirconium and titanium or metal chelate compounds thereof.

Examples of the above-mentioned particulate metal oxides include particulates of aluminum oxide, titanium oxide, antimony oxide, zirconium oxide, silicon oxide and cerium oxide.

A coating composition of the present invention can form a cured coating by being applied to substrates and cured. Curing of the coating composition is performed by heat drying or active energy ray radiation. The curing is preferably performed in hot air at 70-200° C. conditions, particularly preferably at 90-150° C. Active energy ray includes far-infrared ray which can suppress damage caused by heating.

A coating composition of the present invention can form a cured coating by being applied to substrates and cured. In addition, in the present invention, an optical member having on its surface stacked films of a cued coating, an impact absorption film and an anti-reflective coating made of the above-mentioned coating composition can be obtained.

Methods of forming a cured coating on a substrate made of the coating composition of the preset invention include a method of applying the above-mentioned coating composition to the substrate. Usual methods such as dipping method, spin method and spray method may be used as applicable procedures. Dipping method and spin method are particularly preferable due to a size of surface area.

Moreover, before applying the above described coating composition to a substrate, an adhesion and other properties can be improved by utilizing treatments including chemical treatments using such as acids, bases and various organic solvents; physical treatments using such as plasma and ultraviolet; detergent treatment using various detergents; and primer treatment using various resins.

The modified metal oxide particles described in components (T) may be added as a refractive index adjuster to the above-mentioned resins for primers.

Furthermore, a single-layer or a multi-layer anti-reflective coating made of already known a vapor-deposited film of inorganic oxides, which are not particularly restricted, may be used for an anti-reflective coating of the vapor-deposited film of inorganic oxides set on the cured coating made of the coating composition of the present invention. Examples of the anti-reflective coating include anti-reflective coatings disclosed in Japanese Patent Application Publication Nos. JP-A-2-262104 and JP-A-56-116003, for example.

An impact absorption film improves impact resistance. The impact absorption film is constituted of a sol of the present invention and resins such as polyacrylic acid type resins, polyvinyl acetate type resins and polyvinyl alcohol type resins.

A cured coating made of the coating composition of the present invention may be used for a reflection film as a high refractive index film. In addition, the cured coating may also be used for a multifunctional film by adding functional components such as antifog, photochromic and antifouling.

An optical member having the cured coating made of the coating composition of the present invention may be used for camera lenses, windshields of automobiles, optical filters adapted on liquid crystal displays and plasma displays, as well as glasses lenses.

EXAMPLES

Production Example A

Production Method of Basic Tin Chloride Aqueous Solution 419 g of 35% hydrochloric acid and 150 g of purified water were poured into a IL vessel, and the resultant mixture was heated up to 50° C. with agitation. Then, 311 g of 35% hydrogen peroxide and 180 g of metal tin powder (AT-SnNO200N, containing 99.7% by mass as $SnO_2$; manufactured by YAMAISHI METALS Co., Ltd) was added one after another eighteen times by dividing the materials, with cooling. The addition of hydrogen peroxide and metal tin was performed by a method in which 16.4 g of 35% hydrogen peroxide was added first, then 10.0 g of metal tin was added in small portions, and after waiting a completion of the reaction (for 10-15 min), the addition of hydrogen peroxide and metal tin was repeated in the same way. The temperature of the reaction became 60-85° C. due to the heat of reaction. Therefore, the reaction temperature was 60-85° C. The molar ratio of hydrogen peroxide and metal tin of $H_2O_2/Sn$ was 2.0. The required time for the addition of hydrogen peroxide and metal tin was 1.5 hours. After the addition, the resultant mixture was aged for 1 hour with maintaining the liquid temperature of 80° C. The obtained basic salt aqueous solution was 1158.7 g, and the metal oxide concentration was 19.6%.

Production Example B

Preparation of Alkaline Component Containing Antimony Pentoxide Colloid 12.5 kg of antimony trioxide (containing 99.5% by mass of $Sb_2O_3$; manufacture by Guangdong Mikuni), 66.0 kg of purified water and 12.5 kg of potassium hydroxide (containing 95% by mass as KOH) were poured into a 100 L vessel, and 8.4 kg of 35% hydrogen peroxide was added in small portions with agitation. The concentration of the obtained alkaline potassium antimonate aqueous solution was 15.25% by mass as $Sb_2O_5$, and 5.36% by mass as potassium hydroxide. The molar ratio of $K_2O/Sb_2O_5$ was 1.0.

The obtained potassium antimonate aqueous solution was diluted to 2.5% by mass, and the resultant aqueous solution was made to pass through the column packed with a hydrogen type cation exchange resin. After ion exchanging, 6.6 kg of diisopropylamine was added to the antimonic acid aqueous solution with agitation to obtain a solution of alkaline component containing antimony pentoxide colloid (B1). The alkaline component containing antimony pentoxide colloid (B1) contained 1-10 nm colloidal particles, which can be observed by transmission electron microscopic observation, and an oligomer, which cannot be observed by transmission electron microscopic observation. The concentration of the solution was 1.8% by mass as $Sb_2O_5$ and 1.2% by mass as diisopropyl amine, and the molar ratio of the solution as diisopropylamine/$Sb_2O_5$ was 1.69. The primary particle diameter of the colloid determined by a transmission electron microscopic observation was 1-10 nm.

Production Example C

Preparation of Antimony Pentoxide-Silicon Dioxide Composite Colloid 546 g of a potassium silicate aqueous solution (containing 15.4% by mass as $SiO_2$) was diluted with 542 g of purified water, and then a potassium antimonate aqueous solution (containing 14.6% by mass as $Sb_2O_5$) was added with agitation. After one-hour continuous agitation, the mixed aqueous solution of potassium silicate and potassium antimonate was obtained.

The obtained mixed aqueous solution of potassium silicate and potassium antimonate was diluted to 5% by mass with purified water, and then the resultant aqueous solution was made to pass through the column packed with a cation exchange resin to obtain the solution of antimony pentoxide-silicon dioxide composite colloid (B2).

Production Example D

Preparation of Tungsten Oxide-Tin oxide-Silicon Dioxide Composite Colloid 207 g of No. 3 diatom (containing 29.0% by mass as $SiO_2$) was dissolved into 2650 g of water, and then 60.8 g of sodium tungstate $Na_2WO_4.2H_2O$ (contain 74% by mass as $WO_3$) and 81.8 g of sodium stannate $NaSnO_3.H_2O$ (containing 55% by mass as $SnO_2$) was dissolved into the solution. Then, the resultant aqueous solution was made to pass through the column packed with the hydrogen type cation exchange resin (IR-120B) to obtain 3450 g of the acidic sol of tungsten oxide-tin oxide-silicon dioxide composition (having a pH of 2.1; containing 1.3% by mass as $WO_3$, 1.3% by mass as $SnO_2$ and 1.7% by mass as $SiO_2$; and having a mass ratio of 1.0 as $WO_3/SnO_2$, a mass ratio of 1.33 as $SiO_2/SnO_2$, and a particle diameter of 2.5 nm).

Example 1

500.0 g (containing 88.5 g as $ZrO_2$) of a zirconium oxychloride aqueous solution and 110.1 g (containing 21.6 g as $SnO_2$) of a basic tin chloride aqueous solution obtained in Production Example A were poured into a 1 L vessel, and the resultant aqueous solution was heated and aged at 95° C. for 1 hour. Then the total metal oxide concentration of the obtained aqueous solution was diluted to 1%, and the resultant aqueous solution was treated hydrothermally at 150° C. for 5 hours in a glass lined autoclave vessel with agitation to obtain a colloidal slurry of zirconium oxide-tin oxide composite (A).

Then the obtained colloidal slurry of the zirconium oxide-tin oxide composite (A) was irrigated and washed with approximately 70 L of water using an ultrafiltration apparatus for removing excessive electrolyte and destroying aggregation of particles to obtain 5764 g (containing 98 g as $ZrO_2$+$SnO_2$) of an acidic zirconium oxide-tin oxide composite aqueous sol (process (a)).

A diameter of the primary particle of the obtained zirconium oxide-tin oxide colloidal particles was approximately 2-7 nm. A molar ratio of $SnO_2/ZrO_2$ determined by fluorescent X-ray was 0.19.

Then, 2117.6 g (containing 36.0 g as total metal oxides) of the obtained zirconium oxide-tin oxide composite colloid was added to 300.0 g (containing 3.6 g as $Sb_2O_5$) of the alkyl amine containing antimony pentoxide (B1) prepared in Production Example C in a 3 L vessel with agitation. The mixed solution was made to pass through the column packed with the anion exchange resin (Amberlite IRA-410, manufactured by Organo Corporation), and then the resultant solution was additionally heated and aged at 95° C. for 2 hours to obtain the basic zirconium oxide-tin oxide composite aqueous sol modified with antimony pentoxide (process (a1)).

180 g (containing 3.6 g as total metal oxides) of a Sb$_2$O$_5$—SiO$_2$ composite colloid (B2) solution produced in Production Example C was added to the obtained aqueous sol, and then the resultant solution was heated and aged at 95° C. for 2 hours (process (b2)). Moreover, water in the obtained aqueous sol was removed under slightly reduced pressure (approximately 100 kPa) using a rotary evaporator with adding methanol little by little to obtain 1319.1 g of a methanol sol of the modified zirconium oxide-tin oxide composite particles (AB2) in which water of the aqueous sol was replaced with methanol.

The obtained sol had a specific gravity of 1.026, a viscosity of 2.0 mPs·s, a pH of 7.5 (measured in a mixture having an equal amount by mass of water) and a concentration of 25.1%. A mass ratio of (B2)/(A1) of the sol was 0.10 as a mass ratio of metal oxides, and a diameter of the primary particle was 5 nm.

Example 2

The aqueous sol of the basic zirconium oxide-tin oxide composite (A1) modified with antimony pentoxide obtained in Example 1 was treated hydrothermally at 200° C. for 5 hours in a stainless-steel autoclave vessel with agitation (process (a2)) to obtain a hydrothermally treated modified sol of zirconium oxide-tin oxide composite (A1).

180 g (containing 3.6 g as total metal oxides) of the Sb$_2$O$_5$—SiO$_2$ composite colloid (B2) prepared in Production Example C was added to 2300 g (containing 36.0 g as total metal oxides) of the aqueous sol obtained by hydrothermal treatment, and then the resultant mixture was heated and aged at 95° C. for 2 hours to obtain an aqueous sol of the modified zirconium oxide-tin oxide composite (AB2) (process (b2)).

Moreover, water in the obtained aqueous sol was removed under slightly reduced pressure (approximately 100 kPa) using a rotary evaporator with adding methanol little by little to obtain 120.5 g of a modified zirconium oxide-tin oxide methanol sol in which water of the aqueous sol was replaced with methanol. The obtained sot had a specific gravity of 1.084, a viscosity of 3.0 mPa·s, a pH of 7.1 (measured in a mixture having an equal amount by mass of water) and a concentration of 30.3%. A mass ratio of (B2)/(A1) of the sol was 0.10 as a mass ratio of metal oxides, and a diameter of the primary particle was 5 nm.

Example 3

55.3 g (containing 10.8 g as SnO$_2$) of the basic tin chloride aqueous solution obtained in Production Example A was mixed to 500.0 g (containing 88.5 g as ZrO$_2$) of the zirconium oxychloride aqueous solution in a 1 L vessel, and then the resultant mixture was heated and aged at 95° C. for 1 hour. Then the total metal oxide concentration of the obtained aqueous solution was diluted to 1%, and the resultant aqueous solution was treated hydrothermally at 150° C. for 5 hours in a glass lined autoclave vessel with agitation to obtain a colloidal slurry of zirconium oxide-tin oxide composite (A).

Then the obtained colloidal slurry of zirconium oxide-tin oxide composite (A) was irrigated and washed with approximately 65 L of water using an ultrafiltration apparatus for removing excessive electrolyte and destroying aggregation of particles to obtain 3560 g of an aqueous sol of an acidic zirconium oxide-tin oxide composite sol (A) (containing 89 g as ZrO$_2$+SnO$_2$) (process (a)).

A diameter of the primary particle of the obtained zirconium oxide-tin oxide colloidal particles was approximately 2-7 nm. A molar ratio of SnO$_2$/ZrO$_2$ determined by fluorescent X-ray was 0.11.

Then, 1957.0 g (containing 45.0 g as total metal oxides) of the obtained aqueous sol of the zirconium oxide-tin oxide composite (A) was added to 281.3 g (containing 4.5 g as Sb$_2$O$_5$) of the allyl amine-containing antimony pentoxide prepared in Production Example B in a 3 L vessel with agitation. The mixed solution was made to pass through the column packed with the anion exchange resin (Amberlite-IRA-410, manufactured by Organo Corporation), and then the resultant solution was additionally heated and aged at 95° C. for 2 hours to obtain the basic zirconium oxide-tin oxide composite (A1) aqueous sol modified with antimony pentoxide (process (a1)).

109.3 g (containing 4.7 g as total metal oxides) of the aqueous sol of tungsten oxide-tin oxide-silicon dioxide composite (B3) prepared in Production Example D was added to 2351 g (containing 47.1 g as total metal oxides) of the obtained aqueous sol with agitation, and then the resultant solution was heated and aged at 95° C. for 2 hours to obtain the aqueous sol of the modified zirconium oxide-tin oxide composite (AB3) (process (b3)).

The obtained sol was condensed with the ultrafiltration apparatus. The condensed sol had a specific gravity of 1.078, a viscosity of 1.2 mPa·s, a pH of 8.9 and a total metal concentration of 8.7%. Moreover, water in the obtained aqueous sol was removed under slightly reduced pressure (approximately 100 kPa) using a rotary evaporator with adding methanol little by little to obtain 150.3 g of a modified zirconium oxide-tin oxide methanol sol in which water of the aqueous sol was replaced with methanol. The obtained sol had a specific gravity of 1.084, a viscosity of 3.1 mPa·s, a pH of 8.2 (measured in a mixture having an equal amount by mass of water) and a concentration of 30.3%. A mass ratio of (B3)/(A1) of the sol was 0.10 as a mass ratio of metal oxides, and a diameter of the primary particle was 6 nm.

Example 4

The aqueous sol of the basic zirconium oxide-tin oxide composite (A1) modified with antimony pentoxide obtained in Example 3 was treated hydrothermally at 240° C. for 5 hours in a stainless-steel autoclave vessel with agitation (process (a2)) to obtain a hydrothermally treated modified aqueous sol of the zirconium oxide-tin oxide composite (A1).

85.7 g (containing 3.6 g as total metal oxides) of the aqueous sol of tungsten oxide-tin oxide-silicon dioxide composite (B3) prepared in Production Example D was added to 2300 g (containing 36.0 g as total metal, oxides) of the aqueous sol obtained by hydrothermal treatment with agitation, and then the resultant solution was heated and aged at 95° C. for 2 hours to obtain an aqueous sol of the modified zirconium oxide-tin oxide composite (AB3) (process (b3)). The obtained sol was condensed with the ultrafiltration apparatus. The condensed sol had a pH of 7.7 and a total metal concentration of 9.57%. Moreover, water in the obtained aqueous sol as removed under slightly reduced pressure (approximately 100 kPa) using a rotary evaporator with adding menthol little by little to obtain 150.3 g of a modified zirconium oxide-tin oxide methanol sol in which water of the aqueous sot was replaced with methanol. The obtained sol had a specific gravity of 1.012, a viscosity of 1.5 mPa·s, a pH of 7.5 (measured in a mixture having an equal amount by mass of water) and a concentration of 25.1%. A mass ratio of (B3)/(A1) of the sol was 0.10 as a mass ratio of total metal oxides, and a diameter of the primary particle was 6 nm Comparative Example 1

37.5 kg of oxalic acid ($(COOH)_2 \cdot 2H_2O$) was dissolved into 220 kg of purified water. The resultant solution was poured into a 0.5-$m^3$ glass lined vessel, and was heated up to 70° C. with agitation. Then, 150 kg of 35% hydrogen peroxide and 75 kg of metal tin powder (AT-SnNO200N, containing 99.7% by mass as $SnO_2$; manufactured by YAMAISHI METALS Co., Ltd) were added one after another in fifteen times by dividing the materials. The addition of hydrogen peroxide and metal tin was performed by a method in which 10 kg of 35% hydrogen peroxide was added first, and then 5 kg of metal tin was added, and after waiting a completion of the reaction (for 10-15 min), the addition of hydrogen peroxide and metal tin was repeated in the same way. The required time for the addition was 2.5 hours and, after the addition, the reaction was made to complete with maintaining the solution temperature 90° C. A molar ratio of hydrogen peroxide and tin metal was 2.44 as $H_2O_2/SnO_2$. The obtained tin oxide sol had a yield of 352 kg, a specific gravity of 1.22, a pH of 1.49 and a concentration of 26.1% as $SnO_2$. An oxalic acid concentration from the feed was 7.6% by mass and a molar ratio of $(COOH)_2/SnO_2$ was 0.47. A particle diameter of the tin oxide colloid determined by electron microscopic observation was 10-15 nm, and the particles were spherical and had good dispersibility.

230 kg of the yellowish tin oxide sol was dispersed in 1100 kg of water, and then 3.0 kg of isopropyl amine was added to the dispersion. Then, the resultant mixture was made to pass through the column packed with a hydroxide type anion exchange resin in order to make the dispersion basic. Then, the resultant dispersion was heated and aged at 90° C. and was made to pass through the column packed with a hydroxide type anion exchange resin again to obtain 1431 kg of the basic tin oxide aqueous sol. The obtained sol was a tin oxide sol having stable state, very high transparency, a specific gravity of 1.034, a pH of 11.33, a content of $SnO_2$ of 4.04% by mass and a content of isopropyl amine of 0.21% by mass. Then 500 kg of purified water was added to 9.16 kg (containing 1.62 kg as $ZrO_2$) of a zirconium oxychloride aqueous solution (containing 17.68% as $ZrO_2$) obtained by dissolving zirconium oxychloride ($ZrOCl_2 \cdot 8H_2O$) into purified water with agitation, and 0.40 kg of 35% hydrochloric acid was added to the resultant solution. 0.270 kg (containing 10.8 kg as $SnO_2$) of the basic tin oxide aqueous sol was added to the solution, and then the resultant mixture was continuously agitated for 10 min. The mixed liquid was heated at 95° C. for 5 hours with agitation to obtain 779.2 kg of the zirconium oxide-tin oxide composite sol. A concentration of the sol is 1.38% by mass as $SnO_2$, 0.21% by mass as $ZrO_2$ and 1.59% by mass as $SnO_2 + ZrO_2$. A molar ratio of $SnO_2/ZrO_2$ was 5.41.

Comparative Example 2

Here, a titanium oxide methanol sol used for a comparative example of the present invention was prepay 587.5 g of titanium tetrachloride (containing 27.2% by mass as $TiO_2$, and 32.0% by mass of Cl; manufactured by Sumitomo Sitix Corporation) and 2608.5 g of water were poured into a 3-L glass separable flask with jacket to prepare 3196 g of the titanium chloride aqueous solution (containing 5.0% by mass as $TiO_2$). 50 g of 28% aqueous ammonia was added to the solution with sting by a glass stir, and then the aqueous solution was hydrolyzed at 95° C. for 10 hours to obtain an aggregate of titanium oxide colloid having a primary particle diameter of 4-8 nm.

The aggregate slurry of titanium oxide colloid was filtrated with suction using 5B filter paper, and then the resultant substance was irrigated and washed with approximately 40 L of water in order to remove excessive electrolyte to obtain 620 g of a wet cake of titanium oxide. The obtained wet cake was dispersed in 2576 g of water, and then 8.0 g of isopropyl amine was added in order to alkalify the dispersion. Then the dispersion was made to pass through the column packed with 200 mL of the anion exchange resin (Amberlite IRA410, manufactured by Organo Corporation) to obtain 3890 g of a basic zirconium oxide aqueous sol. The sot was condensed with a rotary evaporator under reduced pressure to obtain 1070 g of a condensed basic zirconium oxide aqueous sol. 12.1 g tartaric acid and 26.1 g of diisopropyl amine were added to the obtained sol with agitation, and then water in the obtained aqueous sol was removed under reduced pressure using the rotary evaporator with adding 25 L of methanol little by little to produce 775.2 g of a titanium oxide methanol sol in which water of the aqueous sol was replaced with methanol. The obtained methanol sol had a specific gravity of 0.970, a viscosity of 4.5 mPa·s, a pH of 8.98 (measured in a mixture having an equal amount by mass of water), an electric conductivity of 1600 μs/cm, a concentration of $TiO_2$ of 20.2% by mass and a concentration of water of 3.4% by mass.

(Light Resistance/Color Change Test of Sols)

Each sol of Example 2, Example 4, Comparative Example 1 and Comparative Example 2 was dried at 110° C. to prepare each powder, respectively. Each powder was formed like a glass plate, and each plate was irradiated with ultraviolet for 10 min under oxygen removing conditions (covered by cellophane tape).

Hunter brightness of each plate of before-irradiation and after-irradiation was measured and evaluated. "Delta" means a difference of Hunter brightness of before-irradiation and after-irradiation.

[Table 1]

TABLE 1

| | Before Irradiation | After Irradiation | Delta |
|---|---|---|---|
| Example 2 | 89.8 | 82.4 | 7.4 |
| Example 4 | 90.0 | 83.0 | 7.0 |
| Comparative Example 1 | 91.5 | 75.6 | 15.9 |
| Comparative Example 2 | 90.4 | 55.2 | 35.2 |

Practically, the result of Comparative Example 1 shows no particular inferiority in light resistance. However, the result of Comparative Example 1 was inferior to that of Example 2 and Example 4.

(Preparation of Coating Composition)

Example 5

Into glass container equipped with a magnetic stirrer, 105.3 parts by mass of γ-glycidoxy propyl trimethoxy silane corresponding to the above-described component (S) was poured, and 36.8 parts by mass of 0.01 mol/L hydrochloric acid was added dropwise for 3 hours with agitation. After dropwise addition, agitation was performed for 0.5 hours to obtain the partially hydrolyzed substance of γ-glycidoxy propyl trimethoxy silane. Then, 483.4 parts by mass of the modified zirconium oxide-tin oxide composite methanol sol (containing 25.1% by mass calculated as total metal oxides), 65 parts by mass of butyl cellosolve and 4.2 parts by mass of aluminum acetylacetonate as a curing agent were added to 142.1 parts by mass of the partially hydrolyzed substance of γ-glycidoxy propyl trimethoxy silane, and the resultant mixture was agitated sufficiently and then filtered to produce a coating composition.

Formation of Cured Coating

A commercially available polycarbonate plate having a refractive index nD=1.59 was prepared, and the above-mentioned coating composition was applied with spin coat method to the polycarbonate plate. The obtained coated plate was treated thermally at 120° C. for 2 hours in order to cure the coating film. Evaluation results were listed in Table 2.

Example 6

The procedures of Example 5 were followed except that 400.4 parts by mass of the modified zirconium oxide-tin oxide composite methanol sol (containing 30.3% by mass as total met oxides) obtained in Example 3 was used instead of the modified zirconium-tin oxide composite methanol sol obtained in Example 2 and used in Example 5. The evaluation results were listed in Table 2.

Comparative Example 3

The procedures of Example 5 were followed except that 643.6 parts by mass of the titanium oxide methanol sol (containing 20.2% by mass as $TiO_2$) prepared in Comparative Example 2 was used instead of the sol used in Example 5. The evaluation results were listed in Table 2.

Comparative Example 4

The procedures of Example 5 were followed except that 433.3 parts by mass of a tin oxide methanol sol (containing 30.0% by mass as $SnO_2+WO_3$) coated with tungsten oxide-stannic oxide composite particles disclosed in Japanese Patent Application Publication No. JP-A-3-217230 was used instead of the sol used in Example 5. Evaluation results were listed in Table 2.

Comparative Example 5

The procedures of Example 5 were followed except that 650.0 parts by mass of a colloidal silica (methanol sol, containing 20% solid and having an average particle diameter of 15 nm) was used instead of the sol used in Example 5. Evaluation results were listed in Table 2.

Properties of optical members having cured coatings obtained in Examples and Comparative Examples were measured by following measuring methods.

(1) Scratch Resistance Test

Each surface of a cured coating was scratched with a #0000 steel wool, and resistance for the scratch was visually judged. A criterion of resistance for scratch was classified in order of "A", "B" and "C" ("A" is the best).

(2) Existence or Nonexistence of Interference Fringes

Each optical member having a cured coating was visually judged under a fluorescent lamp. A criterion was as follows. "A" means that almost no interference fringes were observed. "B" and "C" had more interference fringes in order.

(3) Adhesion Test

Each cured coating film was crosscut to 100 sections at intervals of 1 mm, and an adhesive tape (Cellotape; manufactured by Nichiban Co., Ltd.) was strongly stuck to the crosscut location, and then rapidly peeled off. After peeling of the adhesive tape, existence or nonexistence of peeled sections was examined.

(4) Hot Water Resistance Test

Each optical member was immersed in hot water of 80° C. for 2 hours and then the adhesion test was performed according to the above-described adhesion test.

(5) Transparency Test

Clouding of each cured coating was visually examined under a fluorescent lamp in a dark room. Criterion was as follows. "A" means that almost no clouding was observed. "B" and "C" had more clouding in order.

(6) Weather Resistance Test

The obtained optical member was exposed to outdoor for one month, and appearance change of the optical member after exposure was visually judged.

[Table 2]

TABLE 2

|  | Scratch Resistance | Interference Fringes | Adhesion | Hot Water Resistance | Transparency | Weather Resistance |
|---|---|---|---|---|---|---|
| Example 5 | A | A | Goad | Good | A | No Change |
| Example 6 | A | A | Good | Good | A | No Change |
| Comparative Example 3 | B | A | Good | Peeled off | B | Bluing |
| Comparative Example 4 | B | A | Good | Partially Peeled off | A | Slightly Yellowing |
| Comparative Example 5 | A | A | Good | Good | A-B | No Change |

Examples 5 and 6 of the present invention had excellent scratch resistance, adhesion, hot water resistance, transparency, weather resistance and degree of interference fringes. However, Comparative Examples 3 and 4 had insufficient scratch resistance, hot water resistance, transparency and weather resistance. In addition, occurrence of interference fringes was observed. Therefore, these Comparative Examples were not preferable.

INDUSTRIAL APPLICABILITY

The present invention relates to a sol containing a silane coupling agent and a zirconium oxide-tin oxide composite colloidal particles having a primary particle diameter of 2-100 nm and a molar ratio of 0.02-0.4 as $SnO_2/ZrO_2$ dispersed in a liquid medium. A coating composition containing The sol may be used for various applications as a hard coating agent or a primer applied to a surface of a plastic lens.

The invention claimed is:

1. A sol comprising zirconium oxide-tin oxide composite colloidal particles (A), wherein
a molar ratio of oxide in the zirconium oxide-tin oxide composite colloidal particles (A) is 0.02-0.4 as $SnO_2/ZrO_2$, and the zirconium oxide-tin oxide composite colloidal particles (A) have a structure in which zirconium oxide colloidal particles and tin oxide colloidal particles are bonded together, and a primary particle diameter of 2-100 nm.

2. A method of producing the sol comprising the zirconium oxide-tin oxide composite colloidal particles (A) according to claim 1, comprising:
process (a) comprising:
mixing an oxyzirconium salt aqueous solution having a concentration of 0.1-50% by mass calculated as $ZrO_2$ and an oxystannate aqueous solution having a concentration of 0.1-50% by mass at a molar ratio of 0.02-0.4 as $SnO_2/ZrO_2$; treating a resultant mixture solution hydrothermally at 100-200° C. for 0.1-50 hours;
producing an aqueous solution comprising zirconium oxide-tin oxide composite colloidal particles in which a primary particle diameter is 2-100 nm and a molar ratio of $SnO_2/ZrO_2$ is 0.02-0.4; and
removing electrolyte from the solution.

3. A sol comprising modified metal oxide particles (A1) formed by coating a surface of zirconium oxide-tin oxide composite colloidal particles (A) as nuclei with amine-containing $Sb_2O_5$ colloidal particles, an oligomer thereof or their mixture (B1), wherein
a molar ratio of oxide in the zirconium oxide-tin oxide composite colloidal particles (A) is 0.02-0.4 as $SnO_2/ZrO_2$, and the zirconium oxide-tin oxide composite colloidal particles (A) have a structure in which zirconium oxide colloidal particles and tin oxide colloidal particles are bonded together, and a primary particle diameter of 2-100 nm,
the amine-containing $Sb_2O_5$ colloidal particles, the oligomer thereof or their mixture (B1) have a molar ratio of $M/Sb_2O_5$ (where M represents an amine molecule) of 0.02-4.00, and
the modified metal oxide particles (A1) have a mass ratio of (B1)/(A) of 0.01-0.50 based on a mass ratio of their metal oxides, and a particle diameter of 2.5-100 nm.

4. A method of producing the sol comprising the modified metal oxide particles (A1) according to claim 3, comprising:
processes (a) and (a1),
the process (a) comprising:
mixing an oxyzirconium salt aqueous solution having a concentration of 0.1-50% by mass calculated as $ZrO_2$ and an oxystannate aqueous solution having a concentration of 0.1-50% by mass at a molar ratio of 0.02-0.4 as $SnO_2/ZrO_2$;
treating a resultant mixture solution hydrothermally at 100-200° C. for 0.1-50 hours;
producing an aqueous solution comprising zirconium oxide-tin oxide composite colloidal particles in which a primary particle diameter is 2-100 nm and a molar ratio of $SnO_2/ZrO_2$ is 0.02-0.4; and
removing an electrolyte from the aqueous solution, and
the process (A1) comprising:
coating particle surface of a sol comprising zirconium oxide-tin oxide composite colloidal particles (A) obtained by the process (a) with amine-containing $Sb_2O_5$ colloidal particles having a molar ratio of $M/Sb_2O_5$ (where M represents an amine molecule) of 0.02-4.00, an oligomer thereof or their mixture (BI), at a mass ratio of (B1)/(A) calculated as their metal oxide of 0.01-0.50;
aging a resultant aqueous medium at 20-100° C. for 0.1-50 hours; and
removing an electrolyte from the resultant aqueous medium.

5. A method of producing the sol comprising the modified metal oxide particles (A1) according to claim 3 comprising:
processes (a), (A1) and (b1),
the process (a) comprising:
mixing an oxyzirconium salt aqueous solution having a concentration of 0.1-50% by mass calculated as $ZrO_2$ and an oxystannate aqueous solution having a concentration of 0.1-50% by mass at a molar ratio of 0.02-0.4 as $SnO_2/ZrO_2$;
treating a resultant mixture solution hydrothermally at 100-200° C. for 0.1-50 hours;
producing an aqueous solution comprising zirconium oxide-tin oxide composite colloidal particles in which a primary particle diameter is 2-100 nm and a molar ratio of $SnO_2/ZrO_2$ is 0.02-0.4; and
removing an electrolyte from the aqueous solution,
the process (A1) comprising:
coating particle surface of a sol comprising zirconium oxide-tin oxide composite colloidal particles (A) obtained by the process (a), with amine-containing $Sb_2O_5$ colloidal particles having a molar ratio of $M/Sb_2O_5$ (where M represents an amine molecule) of 0.02-4.00, an oligomer thereof or their mixture (B1), at a mass ratio of (B1)/(A) calculated as their metal oxide of 0.01-0.50;
aging a resultant aqueous medium at 20-100° C. for 0.1-50 hours; and
removing an electrolyte from the resultant aqueous medium, and
the process (b1) comprising:
coating particle surface of a sol comprising metal oxide particles (A1) obtained by the process (A1) again with amine-containing $Sb_2O_5$ colloidal particles having a molar ratio of $M/Sb_2O_5$ (where M represents an amine molecule) of 0.02-4.00, an oligomer thereof or their mixture (B1), at a mass ratio of (B1)/(A1) calculated as their metal oxide of less than or equal to 0.49;
aging a resultant aqueous medium at 20-100° C. for 0.1-50 hours; and
removing an electrolyte from the resultant aqueous medium.

6. A method of producing the sol comprising the modified metal oxide particles (A1) according to claim 3, comprising:
processes (a) and (a2),
the process (a) comprising:
mixing an oxyzirconium salt aqueous solution having a concentration of 0.1-50% by mass calculated as $ZrO_2$ and an oxystannate aqueous solution having a concentration of 0.1-50% by mass at a molar ratio of 0.02-0.4 as $SnO_2/ZrO_2$;
treating a resultant mixture solution hydrothermally at 100-200° C. for 0.1-50 hours;
producing an aqueous solution comprising zirconium oxide-tin oxide composite colloidal particles in which a primary particle diameter is 2-100 nm and a molar ratio of $SnO_2/ZrO_2$ is 0.02-0.4; and
removing an electrolyte from the aqueous solution, and
the process (a2) comprising:

coating particle surface of a sol comprising zirconium oxide-tin oxide composite colloidal particles (A) obtained by the process (a) with an amine-containing $Sb_2O_5$ colloidal particle having a molar ratio of $M/Sb_2O_5$ (where M represents an amine molecule) of 0.02-4.00, an oligomer thereof or their mixture (B1), at a mass ratio of (B1)/(A) calculated as their metal oxide of 0.01-0.50;

aging a resultant aqueous medium at 20-100° C. for 0.1-50 hours;

removing an electrolyte from the resultant aqueous medium; and then treating the resultant aqueous medium hydrothermally at 200-300° C. for 0.1-50 hours.

7. A method of producing the sol comprising the modified metal oxide particles (A1) according to claim 3, comprising:

processes (a), (a2) and (b1), the process (a) comprising:

mixing an oxyzirconium salt aqueous solution having a concentration of 0.1-50% by mass calculated as $ZrO_2$ and oxystannate aqueous solution having a concentration of 0.1-50% by mass at a molar ratio of 0.02-0.4 as $SnO_2/ZrO_2$;

treating a resultant mixture solution hydrothermally at 100-200° C. for 0.1-50 hours;

producing an aqueous solution comprising zirconium oxide-tin oxide composite colloidal particles in which a primary particle diameter is 2-100 nm and a molar ratio of $SnO_2/ZrO_2$ is 0.02-0.4; and removing an electrolyte from the aqueous solution, the process (a2) comprising:

coating particle surface of a sol comprising zirconium oxide-tin oxide composite colloidal particles (A) obtained by the process (a) with amine-containing $Sb_2O_5$ colloidal particles having a molar ratio of $M/Sb_2O_5$ (where M represents an amine molecule) of 0.02-4.00, an oligomer thereof or their mixture (B1), at a mass ratio of (B1)/(A) calculated as their metal oxide of 0.01-0.50;

aging a resultant aqueous medium at 20-100° C. for 0.1-50 hours;

removing an electrolyte from the resultant aqueous medium; and then treating the resultant aqueous medium hydrothermally at 200-300° C. for 0.1-50 hours, and the process (b1) comprising:

coating particle surface of the sol comprising amine-containing zirconium oxide-tin oxide composite colloidal particles (A1) obtained by the process (a2) with the amine-containing $Sb_2O_5$ colloidal particles having a molar ratio of $M/Sb_2O_5$ (where M represents an amine molecule) of 0.02-4.00, the oligomer thereof or their mixture (B1), at a mass ratio of (B1)/(A1) calculated as their metal oxide of less than or equal to 0.49 aging a resultant aqueous medium at 20-100° C. for 0.1-50 hours; and removing an electrolyte from the resultant aqueous medium.

8. A sol comprising modified metal oxide particles (AB2) formed by coating a surface of modified metal oxide particles (A1) as nuclei, formed by coating a surface of zirconium oxide-tin oxide composite colloidal particles (A) with amine-containing $Sb_2O_5$ colloidal particles, an oligomer thereof or their mixture (B1), with antimony pentoxide-silica composite colloidal particles, an oligomer thereof or their mixture (B2), wherein a molar ratio of oxide in the zirconium oxide-tin oxide composite colloidal particles (A) is 0.02-0.4 as $SnO_2/ZrO_2$, and the zirconium oxide-tin oxide composite colloidal particles (A) have a structure in which zirconium oxide colloidal particles and tin oxide colloidal particles are bonded together, and a primary particle diameter of 2-100 nm, the amine-containing $Sb_2O_5$ colloidal particles, the oligomer thereof or their mixture (B1) have a molar ratio of $M/Sb_7O_5$ (where M represents an amine molecule) of 0.02-4.00, the modified metal oxide particles (A1) have a mass ratio of (B1)/(A) of 0.01-0.50 based on a mass ratio of their metal oxides, and a particle diameter of 2.5-100 nm, the antimony pentoxide-silica composite colloidal particles, the oligomer thereof or their mixture (B2) have a molar ratio of $SiO_2/Sb_2O_5$ of 0.55-55, and the modified metal oxide particles (AB2) have a mass ratio of (B2)/(A1) of 0.0 1-0.50 based on a mass ratio of their metal oxides, and a particle diameter of 2.5-100 mn.

9. A method of producing the sol comprising the modified metal oxide particles (AB2) according to claim 8, comprising:

processes (a), (A1) and (b2), the process (a) comprising:

mixing an oxyzirconium salt aqueous solution having a concentration of 0.1-50% by mass calculated as $ZrO_2$ and an oxystannate aqueous solution having a concentration of 0.1-50% by mass at a molar ratio of 0.02-0.4 as $SnO_2/ZrO_2$; treating a resultant mixture solution hydrothermally at 100-200° C for 0.1-50 hours;

producing an aqueous solution comprising zirconium oxide-tin oxide composite colloidal particles in which a primary particle diameter is 2-100 nm and a molar ratio of $SnO_2/ZrO_2$ is 0.02-0.4; and removing an electrolyte from the aqueous solution, the process (A1) comprising:

coating particle surface of a sol comprising zirconium oxide-tin oxide composite colloidal particles (A) obtained by the process (a) with amine-containing $Sb_2O_5$ colloidal particles having a molar ratio of $M/Sb_2O_5$ (where M represents an amine molecule) of 0.02-4.00, an oligomer thereof or their mixture (B1), at a mass ratio of (B1)/(A) calculated as their metal oxide of 0.01-0.50;

aging a resultant aqueous medium at 20-100° C. for 0.1-50 hours; and removing an electrolyte from the resultant aqueous medium, and the process (b2) comprising:

mixing a sol comprising zirconium oxide-tin oxide composite colloidal particles (A1) obtained by the process (A1) with an aqueous medium comprising antimony pentoxide-silica composite colloidal particles having a molar ratio of $SiO_2/Sb_2O_5$ of 0.55-55, an oligomer thereof or their mixture (B2), at a mass ratio of (B2)/(A1) calculated as their metal oxide of 0.01-0.50;

aging a resultant aqueous medium at 20-100° C. for 0.1-50 hours; and removing an electrolyte from the resultant aqueous medium.

10. A method of producing the sol comprising the modified metal oxide particles (AB2) according to claim 8, comprising:

processes (a), (a2) and (B2), the process (a) comprising:

mixing an oxyzirconium salt aqueous solution having a concentration of 0.1-50% by mass calculated as $ZrO_2$ and an oxystannate aqueous solution having a concentration of 0.1-50% by mass at a molar ratio of 0.02-0.4 as $SnO_2/ZrO_2$;

treating a resultant mixture solution hydrothermally at 100-200° C. for 0.1-50 hours;

producing an aqueous solution comprising zirconium oxide-tin oxide composite colloidal particles in which a primary particle diameter is 2-100 nm and a molar ratio of $SnO_2/ZrO_2$ is 0.02-0.4; and removing an electrolyte from the aqueous solution, the process (a2) comprising:

coating particle surface of a sol comprising zirconium oxide-tin oxide composite colloidal particles (A) obtained by the process (a) with amine-containing $Sb_2O_5$ colloidal particles having a molar ratio of $M/Sb_2O_5$ (where M represents an amine molecule) of 0.02-4.00, an oligomer thereof or their mixture (B1), at a mass ratio of (B1)/(A) calculated as their metal oxide of 0.01-0.50;

aging a resultant aqueous medium at 20-100° C. for 0.1-50 hours;

removing an electrolyte from the resultant aqueous medium; and then treating the resultant aqueous medium hydrothermally at 200-300° C. for 0.1-50, and the process (b2) comprising:

mixing a sol comprising amine-containing zirconium oxide-tin oxide composite colloidal particles (A1) obtained by the process (a2) with an aqueous medium of antimony pentoxide-silica composite colloidal particles having a molar ratio of $SiO_2/Sb_2O_5$ of 0.55-55, an oligomer thereof or their mixture (B2), at a mass ratio of (B2)/(A1) calculated as their metal oxide of 0.01-0.50;

aging a resultant aqueous medium at 20-100° C. for 0.1-50 hours; and removing an electrolyte from the resultant aqueous medium.

11. A sol comprising modified metal oxide particles (AB3) formed by coating the surface of modified metal oxide particles (A1) as nuclei, formed by coating a surface of zirconium oxide-tin oxide composite colloidal particles (A) with amine-containing $Sb_2O_5$ colloidal particles, an oligomer thereof or their mixture (B1), with tungsten oxide-tin oxide-silicon dioxide composite colloidal particles (B3), wherein a molar ratio of oxide in the zirconium oxide-tin oxide composite colloidal particles (A) is 0.02-0.4 as $SnO_2/ZrO_2$, and the zirconium oxide-tin oxide composite colloidal particles (A) have a structure in which zirconium oxide colloidal particles and tin oxide colloidal particles are bonded together, and a primary particle diameter of 2-100 nm, the amine-containing $Sb_2O_5$ colloidal particles, the oligomer thereof or their mixture (B1) have a molar ratio of $M/Sb_2O_5$ (where M represents an amine molecule) of 0.02-4.00, the modified metal oxide particles (A1) have a mass ratio of (B1)/(A) of 0.01-0.50 based on a mass ratio of their metal oxides, and a particle diameter of 2.5-100 nm, the tungsten oxide-tin oxide-silicon dioxide composite colloidal particles (B3) have a mass ratio of $WO_3/SnO_2$ of 0.1-100, a mass ratio of $SiO_2/SnO_2$ of 0.1-100, and a particle diameter of 2-7 nm, and the modified metal oxide particles (AB3) have a mass ratio of (B3)/(A1) of 0.02-1 based on a mass ratio of their metal oxides, and a particle diameter of 2.5-100 nm.

12. A method of producing the sol comprising the modified metal oxide particles (AB3) according to claim 11, comprising:

processes (a), (A1) and (b3), the process (a) comprising:

mixing an oxyzirconium salt aqueous solution having a concentration of 0.1-50% by mass calculated as $ZrO_2$ and an oxystannate aqueous solution having a concentration of 0.1-50% by mass at a molar ratio of 0.02-0.4 as $SnO_2/ZrO_2$;

treating a resultant mixture solution hydrothermally at 100-200° C for 0.1-50 hours;

producing an aqueous solution comprising zirconium oxide-tin oxide composite colloidal particles in which a primary particle diameter is 2-100 nm and a molar ratio of $SnO_2/ZrO_2$ is 0.02-0.4; and removing an electrolyte from the aqueous solution, the process (A1) comprising:

coating particle surface of a sol comprising zirconium oxide-tin oxide composite colloidal particles (A) obtained by the process (a) with amine-containing $Sb_2O_5$ colloidal particles having a molar ratio of $M/Sb2O_5$ (where M represents an amine molecule) of 0.02-4.00, an oligomer thereof or their mixture (B1), at a mass ratio of (B1)/(A) calculated as their metal oxide of 0.01-0.50;

aging a resultant aqueous medium at 20-100° C. for 0.1-50 hours; and removing an electrolyte from the resultant aqueous medium, and the process (b3) comprising:

preparing an aqueous solution comprising tungstate, stannate and silicate having a mass ratio of $WO3/SnO_2$ of 0.1-100 and a mass ratio of $SiO_2/SnO_2$ of 0.1-100;

producing a tungsten oxide-tin oxide-silicon dioxide composite (B3) sol by removing cations exiting in the aqueous solution;

mixing the aqueous sol of zirconium oxide-tin oxide composite (A1) obtained by the process (A1) with the tungsten oxide-tin oxide-silicon dioxide composite (B3) sol having a particle diameter of 2-7 nm, and a mass ratio of $WO_3/SnO_2$ of 0.1-100 and a mass ratio of $SiO_2/SnO_2$ of 0.1-100, at a mass ratio of (B3)/(A1) calculated as their metal oxide of 0.02-1;

aging a resultant aqueous medium at 20-100° C. for 0.1-50 hours; and removing an electrolyte from the resultant aqueous medium.

13. A method of producing the sol comprising the modified metal oxide particles (AB3) according to claim 11, comprising:

processes (a), (a2) and (b3), the process (a) comprising:

mixing an oxyzirconium salt aqueous solution having a concentration of 0.1-50% by mass calculated as $ZrO_2$ and an oxystannate aqueous solution having a concentration of 0.1-50% by mass at a molar ratio of 0.02-0.4 as $SnO_2/ZrO_2$;

treating a resultant mixture solution hydrothermally at 100-200° C. for 0.1-50 hours;

producing an aqueous solution comprising zirconium oxide-tin oxide composite colloidal particles in which a primary particle diameter is 2-100 nm and a molar ratio of $SnO_2/ZrO_2$ is 0.02-0.4; and removing an electrolyte from the aqueous solution, the process (a2) comprising:

coating particle surface of a sol comprising zirconium oxide-tin oxide composite colloidal particles (A) obtained by the process (a) with amine-containing Sb$_2$O$_5$ colloidal particles having a molar ratio of M/Sb$_2$O$_5$ (where M represents an amine molecule) of 0.02-4.00, an oligomer thereof or their mixture (B1), at a mass ratio of (B1)/(A) calculated as their metal oxide of 0.01-0.50;

aging a resultant aqueous medium at 20-100° C. for 0.1-50 hours;

removing an electrolyte from the resultant aqueous medium; and then treating the resultant aqueous medium hydrothermally at 200-300° C. for 0.1-50 hours, and the process (b3) comprising:

preparing an aqueous solution comprising tungstate, stannate and silicate having a mass ratio of WO$_3$/SnO$_2$ of 0.1-100 and a mass ratio of SiO$_2$/SnO$_2$ of 0.1-100;

producing a tungsten oxide-tin oxide-silicon dioxide composite (B3) sol by removing cations exiting in the aqueous solution;

mixing an aqueous sol of zirconium oxide-tin oxide composite (A1) obtained by the process (a2) and the tungsten oxide-tin oxide-silicon dioxide composite (B3) sol having a particle diameter of 2-7 nm, and a mass ratio of WO$_3$/SnO$_2$ of 0.1-100 and a mass ratio of SiO$_2$/SnO$_2$ of 0.1-100, at a mass ratio of (B3)/(A1) calculated as their metal oxide of 0.02-1;

aging a resultant aqueous medium at 20-100° C. for 0.1-50 hours; and removing an electrolyte from the resultant aqueous medium.

14. A coating composition comprising a component (S) and a component (T1), wherein the component (S) is at least one silicon-containing substance selected from a group consisting of an organic silicon compound represented in Formula (I):

(where each of R$^1$ and R$^3$ is selected from organic groups having alkyl group, aryl group, halogenated alkyl group, halogenated aryl group, alkenyl group, or epoxy group, acryloyl group, methacryloyl group, mercapto group, amino group, or cyan group, and bonding to silicon atoms with Si-C bond; R$^2$ is alkyl group, alkoxylalkyl group or acyl group of 1-8 carbon(s); each of a and b is an integer of 0,1 or 2, and a+b is an integer of 0,1 or 2) and, in Formula (II):

(where R$^4$ is alkyl group of 1-5 carbon(s); X is alkyl group or acyl group of 1-4 carbon(s); Y is methylene group or alkylene group of 2-20 carbons, and c is an integer of 0 or 1), and a hydrolysate thereof and the component (T1) is a sol comprising zirconium oxide-tin oxide composite colloidal particles (A), the zirconium oxide-tin oxide composite colloidal particles (A) having a molar ratio of oxides therein of 0.02-0.4 as SnO$_2$/ZrO$_2$, a structure in which zirconium oxide colloidal particles and tin oxide colloidal particles are bonded together, and a primary particle diameter of 2-100 nm.

15. The coating composition according to claim 14, wherein the component (S) comprises at least one silicon-containing substance selected from a group consisting of an organic silicon compound represented in Formula (1) and a hydrolysate thereof.

16. The coating composition according to claim 14, wherein the coating composition comprises at least one curing catalyst selected from a group consisting of metal salts, metal alkoxides and metal chelate compounds.

17. An optical member having a cured coating formed on a surface of an optical substrate by the coating composition according to claim 14.

18. An optical member further comprising an anti-reflective coating on the surface of the optical member according to claim 17.

19. A coating composition comprising a component (S) and a component (T2), wherein the component (S) is at least one silicon-containing substance selected from a group consisting of an organic silicon compound represented in Formula (I):

(where each of R$^1$ and R$^3$ is selected from organic groups having alkyl group, aryl group, halogenated alkyl group, halogenated aryl group, alkenyl group, or epoxy group, acryloyl group, methacryloyl group, mercapto group, amino group, or cyano group, and bonding to silicon atoms with Si-C bond; R$^2$ is alkyl group, alkoxylalkyl group or acyl group of 1-8 carbon(s); each of a and b is an integer of 0,1 or 2, and a–b is an integer of 0,1 or 2) and, in Formula (II):

(where R$^4$ is alkyl group of 1-5 carbon(s); X is alkyl group or acyl group of 1-4 carbon(s); Y is methylene group or alkylene group of 2-20 carbons, and c is an integer of 0 or 1), and a hydrolysate thereof, and the component (T2) is a sol comprising modified metal oxide particles (A1) formed by coating the surface of zirconium oxide-tin oxide composite colloidal particles (A) as nuclei with amine-containing Sb$_2$O$_5$ colloidal particles, an oligomer thereof or their mixture (B1), in which:

a molar ratio of oxide in the zirconium oxide-tin oxide composite colloidal particles (A) is 0.02-0.4 as SnO$_2$/ZrO$_2$, and the zirconium oxide-tin oxide composite colloidal particles (A) have a structure in which zirconium oxide colloidal particles and tin oxide colloidal particles are bonded together, and a primary particle diameter of 2-100;

the amine-containing Sb$_2$O$_5$ colloidal particles, the oligomer thereof or their mixture (B1) have a molar ratio of M/Sb$_2$O$_5$ (where M represents an amine molecule) of 0.02-4.00; and the modified metal oxide particles (AI) have a mass ratio of (B1)/(A) of 0.01-0.50 based on a mass ratio of their metal oxides, and a particle diameter of 2.5-100 nm.

20. A coating composition comprising a component (S) and a component (T3), wherein the component (S) is at least one silicon-containing substance selected from a group consisting of an organic silicon compound represented in Formula (I):

(where each of R$^1$ and R$^3$ is selected from organic groups having alkyl group, aryl group, halogenated alkyl group, halogenated aryl group, alkenyl group, or epoxy group, acryloyl group, methacryloyl group, mercapto group, amino group, or cyano group, and bonding to silicon atoms with Si-C bond; R$^2$ is alkyl group, alkoxylalkyl group or acyl group of 1-8 carbon(s); each of a and b is an integer of 0,1 or 2, and a+b is an integer of 0,1 or 2) and, in Formula (II):

(where R⁴ is alkyl group of 1-5 carbon(s); X is alkyl group or acyl group of 1-4 carbon(s); Y is methylene group or alkylene group of 2-20 carbons, and c is an integer of 0 or 1), and a hydrolysate thereof, and the component (T3) is a sol comprising modified metal oxide particles (AB2) formed by coating the surface of modified metal oxide particles (A1) as nuclei, formed by coating the surface of zirconium oxide-tin oxide composite colloidal particles (A) with amine-containing Sb2O₅ colloidal particles, an oligomer hereof or their mixture (B1), with antimony pentoxide-silica composite colloidal particles, an oligomer thereof or their mixture (B2), in which:

a molar ratio of oxide in the zirconium oxide-tin oxide composite colloidal particles (A) is 0.02-0.4 as $SnO_2/ZrO_2$, and the zirconium oxide-tin oxide composite colloidal particles (A) have a structure in which zirconium oxide colloidal particles and tin oxide colloidal particles are bonded together, and a primary particle diameter of 2-100 nm;

the amine-containing $Sb_2O_5$ colloidal particles, the oligomer thereof or their mixture (B1) have a molar ratio of $M/Sb_2O_5$ (where M represents an amine molecule) of 0.02-4.00;

the modified metal oxide particles (A1) have a mass ratio of (B1)/(A) of 0.01-0.50 based on a mass ratio of their metal oxides, and a particle diameter of 2.5-100 nm;

the antimony pentoxide-silica composite colloidal particles, the oligomer thereof or their mixture (B2) have a molar ratio of $SiO_2/Sb_2O_5$ of 0.55-55; and the modified metal oxide particles (AB2) have a mass ratio of (B2)/(A1) of 0.01-0.50 based on a mass ratio of their metal oxides, and a particle diameter of 2.5-100 nm.

21. A coating composition comprising a component (S) and a component (T4), wherein the component (S) is at least one silicon-containing substance selected from a group consisting of an organic silicon compound represented in Formula (I):

$$(R^4)_a(R^3)_b Si(OR^2)_{4-(a+b)} \quad (I)$$

(where each of R¹ and R³ is selected from organic groups having alkyl group, aryl group, halogenated alkyl group, halogenated aryl group, alkenyl group, or epoxy group, acryloyl group, methacryloyl group, mercapto group, amino group, or cyano group, and bonding to silicon atoms with Si-C bond; R² alkyl group, alkoxylalkyl group or acyl group of 1-8 carbon(s); each of a and b is an integer of 0,1 or 2, and a+b is an integer of 0,1 or 2) and, in Formula (II):

$$[(R^4)_c Si(OX)_{3-c}]_z Y \quad (II)$$

(where R⁴ is alkyl group of 1-5 carbon(s); X is alkyl group or acyl group of 1-4 carbon(s); Y is methylene group or alkylene group of 2-20 carbons, and c is an integer of 0 or 1), and a hydrolysate thereof, and the component (T4) is a sol comprising modified metal oxide particles (AB3) formed by coating the surface of modified metal oxide particles (A1) as nuclei, formed by coating the surface of zirconium oxide-tin oxide composite colloidal particles (A) with amine-containing $Sb_2O_5$ colloidal particles, an oligomer thereof or their mixture (B1), with tungsten oxide-tin oxide-silicon dioxide composite colloidal particles (B3), in which:

a molar ratio of oxide in the zirconium oxide-tin oxide composite colloidal particles (A) is 0.02-0.4 as $SnO_2/ZrO_2$, and the zirconium oxide-tin oxide composite colloidal particles (A) have a structure in which zirconium oxide colloidal particles and tin oxide colloidal particles are bonded together, and a primary particle diameter of 2-100 nm;

the amine-containing $Sb_2O_5$ colloidal particles, the oligomer thereof or their mixture (B1) have a molar ratio of $M/Sb_2O_5$ (where M represents an amine molecule) of 0.02-4.00;

the modified metal oxide particles (A1) have a mass ratio of (B1)/(A) of 0.01-0.50 based on a mass ratio of their metal oxides, and a particle diameter of 2.5-100 nm;

the tungsten oxide-tin oxide-silicon dioxide composite colloidal particles (B3) have a mass ratio of $WO_3/SuO_2$ of 0.1-100 and a mass ratio of $SiO_2/SnO_2$ of 0.1-100, and a particle diameter of 2-7 nm; and the modified metal oxide particles (AB3) have a mass ratio of (B3)/(A1) of 0.02-1 based on a mass ratio of their metal oxides, and a particle diameter of 2.5-100 nm.

* * * * *